(12) United States Patent
Aoki et al.

(10) Patent No.: US 9,798,215 B2
(45) Date of Patent: Oct. 24, 2017

(54) METHOD OF MANUFACTURING ELECTROPHORETIC PARTICLE, ELECTROPHORETIC PARTICLE, ELECTROPHORETIC DISPERSION, ELECTROPHORETIC SHEET, ELECTROPHORETIC DEVICE, AND ELECTRONIC APPARATUS

(71) Applicant: Seiko Epson Corporation, Tokyo (JP)

(72) Inventors: Takashi Aoki, Higashiura-machi (JP); Shinobu Yokokawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/930,745

(22) Filed: Nov. 3, 2015

(65) Prior Publication Data

US 2016/0131925 A1 May 12, 2016

(30) Foreign Application Priority Data

Nov. 7, 2014 (JP) ................................. 2014-227459

(51) Int. Cl.
| | | |
|---|---|---|
| G02F 1/167 | (2006.01) | |
| B32B 27/30 | (2006.01) | |
| C08F 299/08 | (2006.01) | |
| G03G 17/04 | (2006.01) | |
| C08F 30/08 | (2006.01) | |
| B32B 9/04 | (2006.01) | |
| C08F 20/34 | (2006.01) | |
| C08F 220/06 | (2006.01) | |
| C08F 20/56 | (2006.01) | |
| C08F 20/06 | (2006.01) | |
| C08F 220/34 | (2006.01) | |
| C08F 220/08 | (2006.01) | |
| C08F 290/06 | (2006.01) | |
| C08F 293/00 | (2006.01) | |

(52) U.S. Cl.
CPC .............. *G02F 1/167* (2013.01); *B32B 9/048* (2013.01); *B32B 27/30* (2013.01); *B32B 27/308* (2013.01); *C08F 20/06* (2013.01); *C08F 20/34* (2013.01); *C08F 20/56* (2013.01); *C08F 30/08* (2013.01); *C08F 220/06* (2013.01); *C08F 220/08* (2013.01); *C08F 220/34* (2013.01); *C08F 290/068* (2013.01); *C08F 293/005* (2013.01); *C08F 299/08* (2013.01); *G03G 17/04* (2013.01); *C08F 2438/03* (2013.01); *G02F 2001/1678* (2013.01)

(58) Field of Classification Search
CPC ....... B32B 19/00; B32B 19/045; B32B 27/00; B32B 27/08; B32B 27/14; B32B 27/30; B32B 27/308; B32B 2307/21; B32B 2307/202

See application file for complete search history.

(56) References Cited

U.S. PATENT DOCUMENTS

| | | | |
|---|---|---|---|
| 7,812,091 B2 | 10/2010 | Minami | |
| 7,880,955 B2 | 2/2011 | Naijo et al. | |
| 2003/0097960 A1* | 5/2003 | Ito | C09D 11/30 106/31.58 |
| 2011/0281103 A1* | 11/2011 | Zhou | B82Y 30/00 428/323 |
| 2012/0101217 A1* | 4/2012 | Li | C09D 7/02 524/558 |
| 2012/0329940 A1* | 12/2012 | Shimanaka | C09C 3/12 524/547 |

FOREIGN PATENT DOCUMENTS

| | | |
|---|---|---|
| JP | 2005-352053 A | 12/2005 |
| JP | 2010-14974 A | 1/2010 |
| JP | 2013-156381 A | 8/2013 |

* cited by examiner

*Primary Examiner* — Marc Zimmer
(74) *Attorney, Agent, or Firm* — ALG Intellectual Property, LLC

(57) ABSTRACT

There is provided a method of manufacturing an electrophoretic particle, in which the electrophoretic particle includes a mother particle and a block copolymer, including: a step of polymerizing a monomer M having a site contributing to dispersibility into a dispersion medium, a monomer M including a second functional group having reactivity with the first functional group, a charged monomer M by living polymerization without random copolymerizing the monomer M1 and the monomer M2 so as to obtain the block copolymer; and a step of reacting the first functional group and the second functional group to a bonding section to a mother particle so as to connect the block copolymer to the mother particle.

25 Claims, 10 Drawing Sheets

METHOD OF MANUFACTURING ELECTROPHORETIC PARTICLE, ELECTROPHORETIC PARTICLE, ELECTROPHORETIC DISPERSION, ELECTROPHORETIC SHEET, ELECTROPHORETIC DEVICE, AND ELECTRONIC APPARATUS

BACKGROUND

1. Technical Field

The present invention relates to a method of manufacturing an electrophoretic particle, an electrophoretic particle, an electrophoretic dispersion, an electrophoretic sheet, an electrophoretic device, and an electronic apparatus.

2. Related Art

Generally, it is known that, when an electric field is applied to a dispersion system in which particles are dispersed in a liquid, particles are moved (migrated) in a liquid by the Coulomb force. This phenomenon is referred to as electrophoresis. Recently, an electrophoretic display device displaying desired information (image) using this electrophoresis has attracted attention as a new display device.

This electrophoretic display device is characterized in that it has display memory properties and wide viewing angle properties in a state in which the application of a voltage is stopped, and in that high-contrast display is possible with low power consumption.

Further, the electrophoretic display device is also characterized in that it is easy on the eyes compared to a light-emitting display device such as Braun tube because it is a non-emitting display device.

It is known that such an electrophoretic display device has an electrophoretic dispersion, in which electrophoretic particles are dispersed in a solvent, between a pair of substrates having electrodes.

In the electrophoretic dispersion having such a configuration, electrophoretic particles including positively-charged particles and negatively-charged particles are used. Thus, when a voltage is applied between a pair of substrates (electrodes), it is possible to display desired information (image).

Referring to FIG. 10, generally, an electrophoretic particle 501 including a base particle 502 and a coating layer 503 consisting of polymers 533 bonded to the base particle 502 is used. As such, since the electrophoretic particle 501 is configured to have such a coating layer 503 (polymers 533), it is possible to disperse and charge the electrophoretic particles 501 in an electrophoretic dispersion.

Meanwhile, the electrophoretic particle having such a configuration, for example, is manufactured using atom transfer radical polymerization (ATRP) as follows.

That is, a base particle 502 is prepared, silane coupling agents 531 each having a polymerization initiation group are bonded to the surface of the base particle 502, and then monomers are polymerized by living radical polymerization based on this polymerization initiation group as a starting point, so as to form polymerized units 532. Then, these polymerized units 532 are grown to provide polymers 533. Through these procedures, properties such as chargeability and dispersibility are imparted, thereby manufacturing the electrophoretic particle 501 (for example, referring to JP-A-2013-156381).

In the electrophoretic particle 501 manufactured using such ATRP, the polymer 533 is produced by polymerizing monomers based on this polymerization initiation group (as a starting point) included in the silane coupling agent bonded to the surface of the base particle 502 to form the polymerized unit 532. In this case, according to the density of the silane coupling agent bonded to the base particle 502 and the kind of monomer, in the molecular weight of the polymerized unit 532 in the produced polymer 533, that is, in the polymerization degree of monomer, there are variations between the adjacent polymerized units 532.

Therefore, there is a problem in that uniform dispersibility cannot be obtained between a plurality of electrophoretic particles contained in an electrophoretic dispersion.

SUMMARY

An advantage of some aspects of the invention is to provide a method of manufacturing an electrophoretic particle, by which electrophoretic particles having both uniform dispersibility and chargeability in an electrophoretic dispersion can be manufactured, an electrophoretic particle which can exhibit such a function, and a high-reliability electrophoretic dispersion, electrophoretic sheet, electrophoretic device, and electronic apparatus, each of which uses such an electrophoretic particle.

According to an aspect of the invention, there is provided a method of manufacturing an electrophoretic particle, in which the electrophoretic particle includes a particle having a first functional group on the surface thereof and a block copolymer bonded to the particle, including: polymerizing a first monomer having a site contributing to dispersibility into a dispersion medium, a second monomer including a second functional group having reactivity with the first functional group, a positively or negatively-charged third monomer by living polymerization without random copolymerizing the first monomer and the second monomer so as to obtain the block copolymer; and reacting the first functional group and the second functional group to connect the block copolymer to the particle.

In this case, it is possible to manufacture an electrophoretic particle having both uniform dispersibility and chargeability in the electrophoretic dispersion.

In the method, it is preferable that, in the polymerizing the first monomer, a dispersing section in which the first monomer is polymerized, a bonding section in which the second monomer is polymerized, and a charging section in which the third monomer polymerized, are connected in this order.

In this case, it is possible to manufacture an electrophoretic particle having both uniform dispersibility and chargeability in the electrophoretic dispersion.

In the method, it is preferable that, in the polymerizing the first monomer, the dispersing section in which the first monomer is polymerized is formed, the bonding section in which the second monomer is polymerized is formed, and then the charging section in which the third monomer polymerized is formed, so as to obtain the block copolymer.

In this case, it is possible to manufacture an electrophoretic particle having both uniform dispersibility and chargeability in the electrophoretic dispersion.

In the method, it is preferable that, in the polymerizing the first monomer, a dispersing section in which the first monomer is polymerized, and a bonding•charging section in which the second monomer and the third monomer are copolymerized, are connected with each other, so as to obtain the block copolymer.

In this case, it is possible to manufacture an electrophoretic particle having both uniform dispersibility and chargeability in the electrophoretic dispersion.

In the method, it is preferable that, in the polymerizing the first monomer, the dispersing section in which the first monomer is polymerized is formed, and then the bonding•charging section in which the second monomer and the third monomer are copolymerized is formed, so as to obtain the block copolymer.

In this case, it is possible to manufacture an electrophoretic particle having both uniform dispersibility and chargeability in the electrophoretic dispersion.

In the method, it is preferable that, in the polymerizing the first monomer, a dispersing•charging section, in which the first monomer and the third monomer are copolymerized, and a bonding section, in which the second monomer is polymerized, are connected with each other, so as to obtain the block copolymer.

In this case, it is possible to manufacture an electrophoretic particle having both uniform dispersibility and chargeability in the electrophoretic dispersion.

In the method, it is preferable that, in the polymerizing the first monomer, the dispersing•charging section in which the first monomer and the third monomer are copolymerized is formed, and then the bonding section, in which the second monomer is polymerized is formed, so as to obtain the block copolymer.

In this case, it is possible to manufacture an electrophoretic particle having both uniform dispersibility and chargeability in the electrophoretic dispersion.

In the method, it is preferable that, in the polymerizing the first monomer, a dispersing•charging section, in which the first monomer and the third monomer are copolymerized, and a bonding•charging section, in which the second monomer and the third monomer are copolymerized, are connected with each other, so as to obtain the block copolymer.

In this case, it is possible to manufacture an electrophoretic particle having both uniform dispersibility and chargeability in the electrophoretic dispersion.

In the method, it is preferable that, in the polymerizing the first monomer, the dispersing•charging section in which the first monomer and the third monomer are copolymerized is formed, and then the bonding•charging section in which the second monomer and the third monomer are copolymerized is formed, so as to obtain the block copolymer.

In this case, it is possible to manufacture an electrophoretic particle having both uniform dispersibility and chargeability in the electrophoretic dispersion.

In the method of manufacturing an electrophoretic particle according to the invention, it is preferable that the living polymerization is living radical polymerization.

In this case, it is possible to manufacture an electrophoretic particle having both uniform dispersibility and chargeability in the electrophoretic dispersion.

In the method, it is preferable that the living radical polymerization is reversible addition-fragmentation chain transfer polymerization.

According to the reversible addition-fragmentation chain transfer polymerization, metal contamination does not occur because a metal catalyst is not used, and the polymerization of the first monomer can easily proceed.

According to another aspect of the invention, there is provided an electrophoretic particle, including: a particle having a first functional group on the surface thereof; and a block copolymer bonded to the particle, wherein the block copolymer is formed by polymerizing a first monomer having a site contributing to dispersibility into a dispersion medium, a second monomer including a second functional group having reactivity with the first functional group, a positively or negatively-charged third monomer without random copolymerizing the first monomer and the second monomer, and wherein, in the unit derived from the second monomer, the first functional group reacts with the second functional group to connect the plurality of block copolymer to the particle.

In this case, each of the electrophoretic particles has both uniform dispersibility and chargeability in the electrophoretic dispersion.

In the electrophoretic particle, it is preferable that the block copolymer is configured such that a dispersing section in which the first monomer is polymerized, a bonding section in which the second monomer is polymerized, and a charging section in which the third monomer polymerized, are connected in this order.

In this case, each of the electrophoretic particles has both uniform dispersibility and chargeability in the electrophoretic dispersion.

In the electrophoretic particle, it is preferable that the block copolymer is configured such that a dispersing section in which the first monomer is polymerized, and a bonding•charging section in which the second monomer and the third monomer are copolymerized, are connected with each other.

In this case, each of the electrophoretic particles has both uniform dispersibility and chargeability in the electrophoretic dispersion.

In the electrophoretic particle, it is preferable that the plurality of block copolymer is configured such that the molecular weight distribution in the dispersing section is 1.2 or less.

In this case, the exposed dispersing sections in the plurality of electrophoretic particles have uniform lengths. Thus, each of the electrophoretic particles in the electrophoretic dispersion exhibits uniform dispersibility.

In the electrophoretic particle, it is preferable that the weight average molecular weight of the dispersing section is 10,000 to 100,000.

In this case, the dispersibility of the electrophoretic particle in the electrophoretic dispersion can be made more excellent.

In the electrophoretic particle, it is preferable that the molecular weight of the first monomer of the base end of the dispersing section, the base end thereof being connected to the bonding section, is smaller than the molecular weight of the first monomer of the front end of the dispersion section.

In this case, the dispersibility of the electrophoretic particle in the electrophoretic dispersion can be made more excellent, and the dispersing section can be densely bonded to the surface of the mother particle.

In the electrophoretic particle, it is preferable that the block copolymer is configured such that a dispersing•charging section in which the first monomer and the third monomer are copolymerized and a bonding section in which the second monomer is polymerized are connected with each other.

In this case, each of the electrophoretic particles has both uniform dispersibility and chargeability in the electrophoretic dispersion.

In the electrophoretic particle, it is preferable that the bonding section is formed by polymerizing 2 to 12 of the second monomers.

In this case, it is possible to reliably bond the bonding section to the surface of the mother particle.

In the electrophoretic particle, it is preferable that the block copolymer is configured such that a dispersing•charging section, in which the first monomer and the third monomer are copolymerized, and a bonding•charging section, in which the second monomer and the third monomer are copolymerized, are connected with each other.

In this case, each of the electrophoretic particles has both uniform dispersibility and chargeability in the electrophoretic dispersion.

In the electrophoretic particle, it is preferable that the first monomer is a silicone macromonomer represented by the following general formula (I).

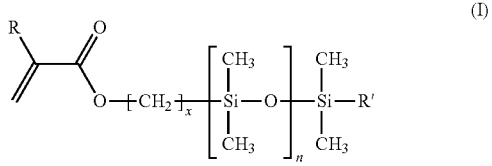

(in the formula, R represents a hydrogen atom or a methyl group, R' represents a hydrogen atom or an alkyl group having 1 to 4 carbon atoms, n represents an integer of 0 or more, and x represents an integer of 1 to 3.)

In this case, when a dispersion medium containing silicone oil as a main component is used as the dispersion medium contained in the electrophoretic dispersion, this first monomer exhibits excellent affinity to the dispersion medium, so that the electrophoretic particle having the dispersing section obtained by polymerizing the first monomer can be dispersed in the dispersion medium having excellent dispersibility.

In the electrophoretic particle, it is preferable that the silicone macromonomer has a molecular weight of 1,000 to 10,000.

In this case, the electrophoretic particle having the dispersing section obtained by the polymerization of the first monomer can be dispersed in the dispersion medium because it has more excellent dispersibility.

According to still another aspect of the invention, there is provided an electrophoretic dispersion, including: the electrophoretic particle manufactured by the method or the electrophoretic particle.

In this case, the electrophoretic dispersion is an electrophoretic dispersion including electrophoretic particles exhibiting excellent dispersibility.

According to still another aspect of the invention, there is provided an electrophoretic sheet, including: a substrate; and a plurality of structures which are disposed on the substrate and each of which contains the electrophoretic dispersion of the invention.

In this case, the electrophoretic sheet having high performance and reliability is obtained.

According to still another aspect of the invention, there is provided an electrophoretic device, including: the electrophoretic sheet.

In this case, the electrophoretic device having high performance and reliability is obtained.

According to still another aspect of the invention, there is provided an electronic apparatus, including: the electrophoretic device.

In this case, the electronic apparatus having high performance and reliability is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a method of manufacturing an electrophoretic particle, an electrophoretic particle, an electrophoretic dispersion, an electrophoretic sheet, an electrophoretic device, and electronic apparatus according to the invention will be described in detail based on preferred embodiments of the invention shown in the attached drawings.

First, prior to a description of a method of manufacturing an electrophoretic particle according to the invention, an electrophoretic particles (electrophoretic particle) manufactured by the method will be described.

Electrophoretic Particle

First Embodiment

Figure 1:
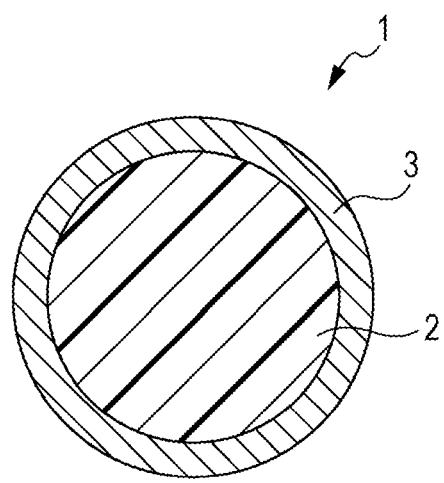
FIG. 1 is a longitudinal sectional view showing a first embodiment of an electrophoretic particle of the invention.
Figure 2:
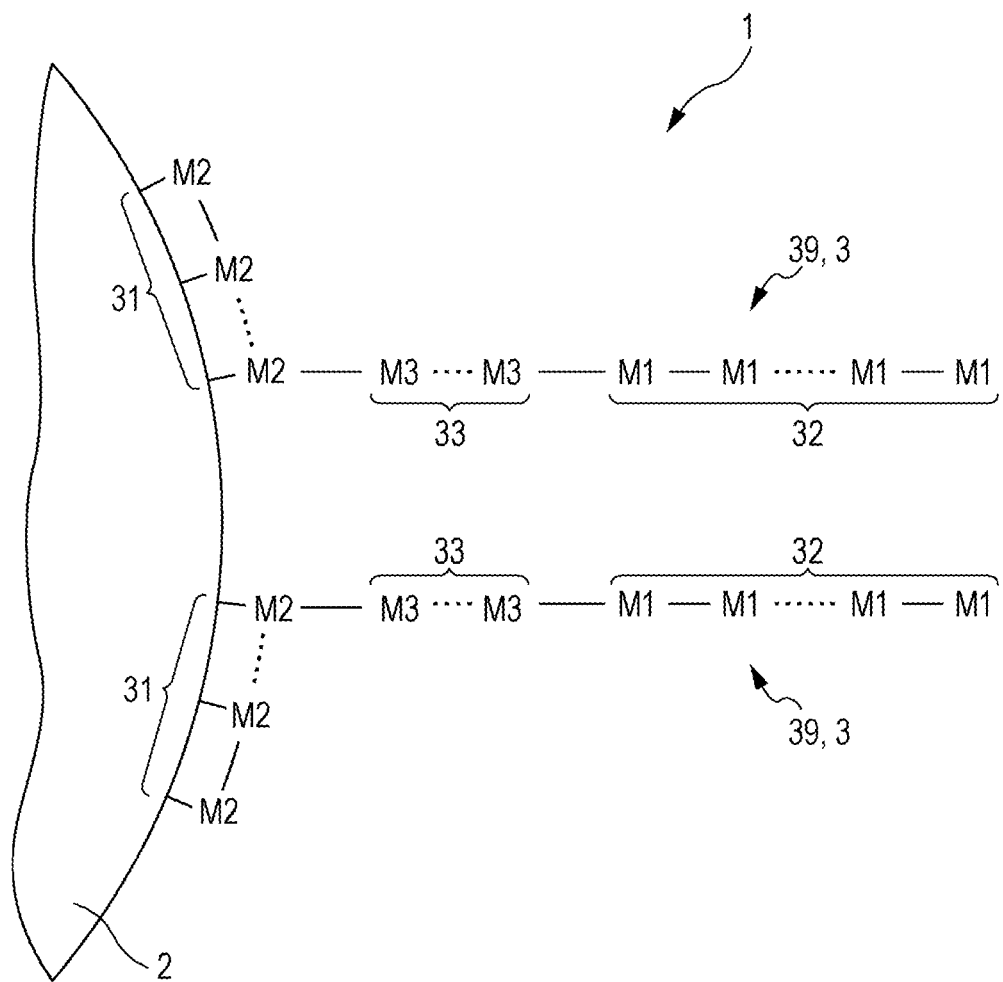
FIG. 2 is a schematic view of a block copolymer included in a first embodiment of an electrophoretic particle of the invention.

FIG. 1 is a longitudinal sectional view showing a first embodiment of an electrophoretic particle of the invention, and FIG. 2 is a schematic view of a block copolymer included in a first embodiment of an electrophoretic particle of the invention.

An electrophoretic particle 1 includes a mother particle (particle) 2 and a coating layer 3 provided on the surface of the mother particle 2.

As the mother particle 2, at least one of a pigment particle, a resin particle, and a composite particle thereof is used. These particles are easily manufactured.

Examples of pigments constituting the pigment particle include: black pigments, such as aniline black, carbon black, and titanium black; white pigments, such as titanium dioxide, antimony trioxide, barium sulfate, zinc sulfide, zinc oxide, and silicon dioxide; azo pigments, such as monoazo, disazo, and polyazo; yellow pigments, such as isoindolinone, chrome yellow, yellow iron oxide, cadmium yellow, titanium yellow, and antimony; red pigments, such as quinacridone red and chrome vermilion; blue pigments, such as phthalocyanine blue, indanthrene blue, prussian blue, ultramarine blue, and cobalt blue; and green pigments, such as phthalocyanine green. These pigments may be used alone or in combination of two or more thereof.

Examples of resin materials constituting the resin particle include acrylic resins, urethane resins, urea resins, epoxy resins, polystyrene, and polyester. These resin materials may be used alone or in combination of two or more thereof.

Examples of the composite particle include a composite particle obtained by coating the surface of the pigment particle with the resin material, a composite particle obtained by coating the surface of the resin particle with the pigment, and a composite particle composed of a mixture of the pigment and the resin material at a suitable composition ratio.

Here, when the kind of the pigment particle, the resin particle, and the composite particle, each of which is used as the mother particle 2, is appropriately selected, the color of the electrophoretic particle 1 can be set to a desired color.

The mother particle 2 is required to have a first functional group capable of connecting(reacting) with a second functional group included in a second monomer M2 (hereinafter, simply referred to as "monomer M2") provided with a bonding section 31 of a polymer 39 to be described later. Here, the first functional group is provided on the surface of the mother particle 2 (exposed to the surface thereof). However, there is a case that the mother particle 2 does not have a functional group according to the kind of the pigment particle, the resin particle, and the composite particle. Therefore, in this case, the first functional group is introduced on the surface of the mother particle 2 by previously performing functional group introduction treatment, such as acid treatment, base treatment, UV treatment, ozone treatment, or plasma treatment.

Here, the combination of the first functional group provided on the surface of the mother particle 2 and the second functional group included in monomer M2 is not particularly limited as long as they can be connected by the reaction with each other. Examples of the combination thereof include a combination of an isocyanate group with a hydroxyl group or an amino group, a combination of an epoxy group, a glycidyl group or an oxetane group with a carboxyl group, an amino group, a thiol group, a hydroxyl group or an imidazole group, a combination of an amino group with a halogen group such as Cl, Br or I, and a combination of an alkoxysilyl group with a hydroxyl group or an alkoxysilyl group. Among these combinations, a combination of a hydroxyl group as the first functional group with an alkoxysilyl group as the second functional group is preferable.

The mother particle 2 and the monomer M2, having this combination, can be relatively easily prepared, respectively, and the monomer M2 (block copolymer to be described later) can be strongly connected to the surface of the mother particle 2. Therefore, this combination of the mother particle 2 and the monomer M2 is preferably used.

Hereinafter, a combination of a hydroxyl group as the first functional group provided on the surface of the mother particle 2 with an alkoxysilyl group as the second functional group included in the monomer M2 will be described as an example.

The mother particle 2 is configured such that at least a part of the surface thereof (almost the entire in the configuration shown in the drawing) is covered with the coating layer 3.

Referring to FIG. 2, the coating layer 3 is configured to include a plurality of block copolymer 39 (hereinafter, simply referred to as "polymer 39").

The block copolymer 39 is formed by polymerizing a first monomer M1 (hereinafter, simply referred to as "monomer M1") having a site (group) contributing to dispersibility into a dispersion medium, a second monomer M2 (hereinafter, simply referred to as "monomer M2") including a second functional group having reactivity with a first functional group, a positively or negatively-charged third monomer M3 (hereinafter, simply referred to as "monomer M3") without random copolymerizing the first monomer M1 and the second monomer M2.

When the block copolymer 39 is configured in this way, dispersibility is imparted to the block copolymer 39 by a unit derived from the monomer M1 (hereinafter, referred to as "dispersing unit"), the block copolymer 39 is connected to the mother particle 2 by a unit derived from the monomer M2 (hereinafter, referred to as "bonding unit"), and the block copolymer 39 is positively or negatively charged by a unit derived from the monomer M3 (hereinafter, referred to as "charging unit"). Therefore, the electrophoretic particle 1 including the block copolymer 39 having such a configuration can exhibit uniform dispersibility and chargeability in an electrophoretic dispersion.

In the present embodiment, this block copolymer 39 is configured such that a dispersing section 32 in which the first monomer M1 is polymerized, a charging section 33 in which the third monomer M3 is polymerized, and the bonding section 31 in which the second monomer M2 is polymerized, are connected in this order. In the block copolymer 39 having such as configuration, the dispersing section 32 is formed by the polymerization of the monomer M1 and includes a plurality of the dispersing units derived from the monomer M1, the charging section 33 is formed by the polymerization of the monomer M3 and includes a plurality of the charging units derived from the monomer M3, and the bonding section 31 is formed by the polymerization of the monomer M2 and includes a plurality of the bonding units derived from the monomer M2. In the bonding section 31 included in the block copolymer 39, the first functional group reacts with the second functional group to allow the mother particle 2 and the block copolymer 39 to be chemically bonded to each other.

Hereinafter, the dispersing section 32, the bonding section 31, and the charging section 33, constituting this block copolymer 39, will be described in detail.

The dispersing section 32 is provided on the surface of the mother particle 2 in the coating layer 3 in order to impart dispersibility to the electrophoretic particle 1 in the electrophoretic dispersion to be described later.

The dispersing section 32 is formed by polymerizing a plurality of the monomers M1 having a site, which is to be a side chain contributing to the dispersibility into a dispersion medium, in the electrophoretic dispersion, and is configured such that a plurality of the dispersing units derived from the monomer M1 are connected to each other.

The monomer M1 is a pendant type mono-functional monomer which is provided with one polymerizable group capable of being polymerized by living radical polymerization (radical polymerization) and which is provided with a site becoming a nonionic side chain after polymerization.

A monomer provided with a nonionic side chain is used as the monomer M1, and the dispersing section 32 formed by living radical polymerization exhibits excellent affinity to a dispersion medium included in the electrophoretic dispersion to be described later. Thus, the electrophoretic particle 1 provided with this dispersing section 32 has excellent dispersibility to be easily dispersed in the electrophoretic dispersion without being aggregated.

Examples of one polymerizable group included in the monomer M1 include carbon-carbon double bond-containing groups, such as a vinyl group, a styryl group, and a (meth)acrylate group.

Examples of the monomer M1 include vinyl monomers, vinyl ester monomers, vinyl amide monomers, (meth)acrylic monomers, (meth)acrylic ester monomers, (meth)acrylamide monomers, and styryl monomers. More specifically, examples thereof include: acrylic monomers, such as 1-hexene, 1-heptene, 1-octene, methyl (meth)acrylate, ethyl (meth)acrylate, propyl (meth)acrylate, stearyl (meth)acrylate, lauryl (meth)acrylate, decyl (meth)acrylate, isooctyl (meth)acrylate, isobornyl (meth)acrylate, cyclohexyl (meth)acrylate, pentafluorophenyl (meth)acrylate, and a silicone macromonomer represented by the following general formula (I); and styrene-based monomers, such as styrene, 2-methyl styrene, 3-methyl styrene, 4-methyl styrene, 2-ethyl styrene, 3-ethyl styrene, 4-ethyl styrene, 2-propyl styrene, 3-propyl styrene, 4-propyl styrene, 2-isopropyl styrene, 3-isopropyl styrene, 4-isopropyl styrene, and 4-tert-butyl styrene. These monomers may be used alone or in combination of two or more thereof.

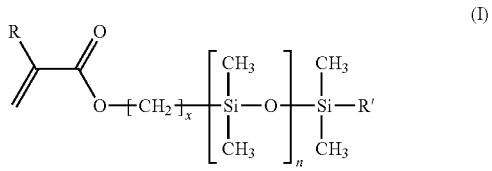

(in the formula, R represents a hydrogen atom or a methyl group, R' represents a hydrogen atom or an alkyl group having 1 to 4 carbon atoms, n represents an integer of 0 or more, and x represents an integer of 1 to 3.)

Among these monomers, as the monomer M1, the silicone macromonomer represented by the above general formula (I) is preferable. The dispersing section obtained by polymerizing such a monomer M1 exhibits excellent dispersibility to a nonpolar dispersion medium. That is, even when a dispersion medium containing silicone oil as a main component is used as the dispersion medium contained in the electrophoretic dispersion to be described later, this dispersion medium exhibit, or even when a hydrocarbon-based solvent is used as the dispersion medium, excellent affinity to the dispersion medium is exhibited. Therefore, the electrophoretic particle 1 having the dispersing section 32 obtained by the polymerization of the monomer M1 can be dispersed in the dispersion medium because it has more excellent dispersibility.

When the silicone macromonomer represented by the above general formula (I) is used as the monomer M1, the weight average molecular weight thereof is preferably 1,000 to 10,000, more preferably 3,000 to 8,000, and further preferably 3,000 to 5,000. Thus, the electrophoretic particle 1 having the dispersing section 32 obtained by the polymerization of the monomer M1 can be dispersed in the dispersion medium because it has more excellent dispersibility.

The weight average molecular weight of the dispersing section 32 is preferably 10,000 to 100,000, and more preferably 30,000 to 60,000. In particular, when the silicone macromonomer represented by the above general formula (I) is used as the monomer M1, or when a hydrocarbon-based solvent is used, the weight average molecular weight of the dispersing section 32 is preferably 30,000 to 70,000, and more preferably 45,000 to 55,000. Thus, it is possible to make the dispersibility of the electrophoretic particle 1 in the electrophoretic dispersion more excellent.

In one polymer, the number of the dispersing units included in the dispersing section 32 is preferably 1 to 20, and more preferably 3 to 10. Thus, it is possible to reliably impart the dispersibility of the electrophoretic particle 1 in the electrophoretic dispersion.

The molecular weight distribution of the dispersing section 32 is preferably 1.2 or less, more preferably 1.1 or less, and further preferably 1.05 or less.

Here, the molecular weight distribution of the dispersing section 32 represents the ratio (Mw/Mn) of the weight average molecular weight (Mw) of the dispersing section 32 to the number average molecular weight (Mn) of the dispersing section 32. When the molecular weight distribution of the dispersing section 32 is within the above range, the exposed dispersing sections 32 in the plurality of electrophoretic particles 1 have uniform lengths. Thus, each of the electrophoretic particles 1 in the electrophoretic dispersion exhibits uniform dispersibility. Such number average molecular weight (Mn) and weight average molecular weight (Mw) can be measured as polystyrene converted molecular weight, for example, using gel permeation chromatography (GPC).

Preferably, the dispersing section 32 is configured such that the molecular weight of the dispersing unit located at the base end thereof connected to the bonding section 31 is smaller than the molecular weight of the dispersing unit located at the front end thereof. More specifically, it is preferable that the molecular weight of the side chain included in the monomer M1 becoming a precursor of the dispersing unit located at the base end of the dispersing section 32 is smaller than the molecular weight of the side chain included in the monomer M1 becoming a precursor of the dispersing unit located at the front end of the dispersing section 32. Thus, the dispersibility of the electrophoretic particle 1 in the electrophoretic dispersion can be made more excellent, and the dispersing section 32 can be bonded to the surface of the mother particle 2 at high density.

Here, the change in molecular weight of the side chain may continuously increase from the base end side toward the front end side, and may also stepwise increase from the base end side toward the front end side.

In the coating layer 3 included in the electrophoretic particle 1, the bonding section 31 is bonded to the surface of the mother particle 2, so as to connect the polymer 39 to the mother particle 2.

In the invention, the bonding section 31 is formed by polymerizing a plurality of the second monomers M2 having the second functional group capable of forming a covalent bond by reacting with the first functional group provided on the surface of the mother particle 2, and is configured such that a plurality of bonding units derived from the monomer M2 are connected with each other.

As such, when the polymer 39 including the bonding section 31 having a plurality of bonding units each having the second functional group is used, the dispersibility of the electrophoretic particle 1 can be made more excellent. That is, the polymer 39 contains a plurality of second functional groups, and the plurality of second functional groups are densely present in the bonding section 31. Since the bonding section 31 has a plurality of bonding units connected with each other, it has a large site capable of reacting with the mother particle 2 compared to when it has only one bonding unit. Therefore, in the bonding section 31 formed by polymerizing a plurality of monomers M2, it is possible to reliably bond the polymer 39 to the surface of the mother particle 2.

Meanwhile, in the present embodiment, as described above, the first functional group provided on the surface of the mother particle 2 is a hydroxyl group, and the second functional group contained in the monomer M2 is alkoxysilyl group. By the combination of such first and second functional groups, excellent reactivity therebetween is exhibited, and thus it is possible to reliably form a bond of the bonding section 31 to the surface of the mother particle 2.

This monomer M2 has one alkoxysilyl group represented by the following general formula (II) as the second functional group. Further, the monomer M2 has one polymerizing group such that it can be polymerized by living radical polymerization.

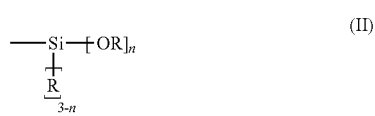

(II)

(in the formula, R each independently represents an alkyl group having 1 to 4 carbon atoms, and n represents an integer of 1 to 3.)

When a monomer having such a configuration is used as the monomer M2, the bonding section 31 can be formed by the living radical polymerization of the monomer M2, and the bonding section 31 formed by the living radical polymerization of the monomer M2 exhibits excellent reactivity to a hydroxyl group which is the first functional group located on the surface of the mother particle 2.

Examples of one polymerizable group included in the monomer M2, similarly to the monomer M1, include carbon-carbon double bond-containing groups, such as a vinyl group, a styryl group, and a (meth)acrylate group.

Examples of the monomer M2 include vinyl monomers, vinyl ester monomers, vinyl amide monomers, (meth)acrylic monomers, (meth)acrylic ester monomers, (meth)acrylamide monomers, and styryl monomers, each having one alloxylsilyl group represented by the above formula (II). More specifically, examples thereof include: silicon atom-containing silane-based monomers, such as 3-(meth)acryloxypropyl triethoxy (methoxy)silane, vinyl triethoxy (methoxy)silane, vinyltriethoxy (methoxy)silane, 4-vinylbutyl triethoxy (methoxy)silane, 4-vinylbutyl triethoxy (methoxy)silane, 8-vinyloctyl triethoxy (methoxy)silane, 8-vinyloctyl triethoxy (methoxy)silane, 10-methacryloyloxydecyl triethoxy (methoxy)silane, 10-acryloyloxydecyl triethoxy (methoxy)silane, 10-methacryloyloxydecyl triethoxy (methoxy)silane, and 10-acryloyloxydecyl triethoxy (methoxy)silane. These monomers may be used alone or in combination of two or more thereof.

In one polymer, the number of the bonding units included in the bonding section 31 is preferably 2 to 8, and more preferably 4 to 6. When the number exceeds the upper limit, since the affinity of the bonding section 31 to a dispersion medium is lower than the affinity of the dispersing section 32 to the dispersion medium, there is a problem in that the dispersibility of the electrophoretic particle 1 deteriorates depending on the kind of the monomer M2, and the bonding section 31 partially react with each other. When the number is less than the lower limit, there is a problem in that the bonding of the bonding section 31 to the mother particle 2 can not sufficiently proceed depending on the kind of the monomer M2, and thus the dispersibility of the electrophoretic particle 1 deteriorates.

The number of the bonding units included in the bonding section 31 can be obtained by the analysis using general-purpose analysis equipment, such as NMR spectrum, IR spectrum, elemental analysis, or gel permeation chromatography (GPC). In the polymer 39, since the bonding section 31, the dispersing section 32, and the charging section 33 are high molecular polymers, all of them have molecular weight distributions. Therefore, although the results of the above-described analysis are not necessarily true for the entire polymer 39, if the number of the bonding units obtained by at least one of the above methods is 2 to 8, the reactivity of the polymer 39 and the mother particle 2 and the dispersibility and electrophoretic properties (chargeability) of the electrophoretic particle 1 can be compatible with each other.

The charging section 33 is included in the block copolymer 39, that is, coating layer 3 in order to impart positive or negative chargeability to the electrophoretic particle 1 in the electrophoretic dispersion to be described later.

In the invention, the charging section 33 is formed by polymerizing a plurality of charged third monomers M3 which are positively or negatively charged, and is configured such that a plurality of charging units derived from the monomer M3 are connected with each other.

As such, when the polymer 39 including the charging section 33 having a plurality of charging units each being positively or negatively charged is used, since the charging section 33 is configured such that the plurality of charging unit are connected with each other, the positive or negative chargeability of the electrophoretic particle 1 can be made more excellent compared to when the charging section 33 has only one charging unit. That is, in the electrophoretic dispersion to be described later, the electrophoretic particle 1 having the polymer 39 including such a charging section 33 is an electrophoretic particle having excellent positive or negative chargeability (positive electrophoretic particle or negative electrophoretic particle).

Examples of the positively charged third monomer M3, that is, cationic monomers include monomers each having an amino group in the structure thereof. Specifically, examples thereof include aminomethyl (meth)acrylate, aminoethyl (meth)acrylate, N,N-dimethylaminoethyl (meth)acrylate, N-ethyl-N-phenyl-aminoethyl (meth)acrylate, N,N-dimethyl (meth)acrylamide, N,N-diethyl (meth)acrylamide, and 4-vinyl pyridine.

Examples of the negatively charged third monomer M3, that is, anionic monomers include monomers each having a carboxyl group or a sulfonyl group in the structure thereof. Specifically, examples thereof include (meth)acrylic acid, carboxymethyl (meth)acrylate, carboxyethyl (meth)acrylate, vinyl benzoate, vinyl phenyl acetate, vinyl phenyl propionate, vinyl sulfonate, sulfomethyl (meth)acrylate, and 2-sulfoethyl (meth)acrylate.

In one polymer, the number of the charging units included in the charging section 33 is preferably 1 to 8, and more preferably 2 to 5. When the number exceeds the upper limit, since the affinity of the charging section 33 to a dispersion medium is lower than the affinity of the dispersing section 32 to the dispersion medium, there is a problem in that the dispersibility of the electrophoretic particle 1 deteriorates depending on the kind of the monomer M3. When the number is less than the lower limit, there is a problem in that the electrophoretic particle 1 cannot be sufficiently charged depending on the kind of the monomer M3, and thus the electrophoretic properties of the electrophoretic particle 1 deteriorates.

The number of the charging units included in the charging section 33 can be obtained by the analysis using general-purpose analysis equipment, such as NMR spectrum, IR spectrum, elemental analysis, or gel permeation chromatography (GPC). As described above, in the polymer 39, since the bonding section 31, the dispersing section 32, and the charging section 33 are high molecular polymers, all of them have molecular weight distributions. Therefore, although the results of the above-described analysis are not necessarily true for the entire polymer 39, if the number of the charging units obtained by at least one of the above methods is 1 to 8, the reactivity of the polymer 39 and the mother particle 2 and the dispersibility and electrophoretic properties (chargeability) of the electrophoretic particle 1 can be compatible with each other.

Such a polymer 39 is a tri-block copolymer which is separately provided with the bonding section 31, the dispersing section 32, and the charging section 33, respectively. Therefore, the bondability to the mother particle 2, the dispersibility of the electrophoretic particle 1, and the chargeability (electrophoretic properties) of the electrophoretic particle 1 each independently can be imparted to the polymer 39, and thus the electrophoretic particle 1 exhibits excellent dispersibility and chargeability.

This polymer 39 is obtained by the manufacturing method to be described later. For example, when reversible addition-fragmentation chain transfer polymerization(RAFT) to be described later is used, it is possible to obtain a relatively uniform polymer. Therefore, if polymerization is performed by the addition of the monomer M2 in an amount of 2 to 8 molar equivalents for a chain transfer agent, the number of the bonding units in the bonding section 31 can be within the above range, and if polymerization is performed by the addition of the monomer M3 in an amount of 1 to 8 molar equivalents for the chain transfer agent, the number of the charging units in the charging section 33 can be within the above range.

Thus, the electrophoretic particle 1 can exhibit the effects due to the configuration of the polymer 39, and the electrophoretic particle 1 has excellent dispersibility and electrophoretic properties (chargeability) in the electrophoretic dispersion.

The electrophoretic particle 1 according to the present embodiment, in which the polymer 39 having the bonding section 31, the dispersing section 32, and the charging section 33 is bonded to the surface of the mother particle 2 through the bonding section 31, can be manufactured as follows using the method of manufacturing an electrophoretic particle according to the invention. Method of manufacturing electrophoretic particle The method of manufacturing an electrophoretic particle 1 includes: a first process of polyermizing monomer M1, monomer M2, and monomer M3 using living polymerization without random copolymerizing the monomer M1 and the monomer M2 to obtain a block copolymer 39; and a second process of reacting a first functional group included in a mother particle 2 with a second functional group included in the monomer M2 to form a coating layer 3 in which a plurality of the block copolymer 39 are connected to the mother particle 2.

In the present embodiment, in the first process, a case of obtaining the plurality of block copolymer 39, in each of which a bonding section 31, the charging section 33, and a dispersing section 32 are connected with each other in this order, will be described.

Further, in the first process, through living radical polymerization using a polymerization initiator, 1) the dispersing section 32 may be formed by the polymerization of the first monomer M1, the charging section 33 may be formed by the polymerization of the third monomer M3 having a third functional group, and then the bonding section 31 may be formed by the polymerization of the second monomer M2 having a second functional group; and 2) the bonding section 31, the charging section 33, and the dispersing section 32 may also be formed in this order. However, here, a case of forming a plurality of block copolymer 39 in the step 1) will be described.

Hereinafter, each process will be described in detail.

[1] First, a plurality of block copolymer 39, in each of which a dispersing section 32, a charging section 33, and a bonding section 31 are connected with each other in this order, are formed (first process).

[1-1] First, a dispersing section 32 is formed by the living polymerization of a first monomer M1 using a polymerization initiator.

As the living polymerization, living radical polymerization, living cationic polymerization, and living anionic polymerization are exemplified. Among these, living radical polymerization is preferable. When living radical polymerization is performed, it is possible to conveniently use the reaction products generated in the reaction system, and it is possible to polymerize the monomer M1 with good reaction controllability.

Further, according to the living radical polymerization, the molecular weight distribution in the dispersing section 32 can be easily set to 1.2 or less, and, as a result, the obtained electrophoretic particle 1 can exhibit uniform dispersibility in an electrophoretic dispersion.

Further, as the living radical polymerization, atom transfer radical polymerization (ATRP), nitroxide-mediated radical polymerization (NMP), radical polymerization using organic tellurium (TERP), and reversible addition-fragmentation chain transfer polymerization (RAFT) are exemplified. Among these, reversible addition-fragmentation chain transfer polymerization (RAFT) is preferable. According to the reversible addition-fragmentation chain transfer polymerization (RAFT), metal contamination does not occur because a metal catalyst is not used, and the polymerization of the monomer M1 can easily proceed. Further, the molecular weight distribution in the dispersing section 32 can be more easily set to 1.2 or less.

The polymerization initiator (radical polymerization initiator) is not particularly limited, but examples thereof include: azo initiators, such as 2,2'-azobisisobutyronitrile (AIBN), 2,2'-azobis(4-methoxy-2,4-dimethyl valeronitrile), 2,2'-azobis(2,4-dimethyl valeronitrile), dimethyl-2,2'-azobis (2-methyl propionate), 1,1'-azobis(cyclohexane-1-carbonitrile), 2,2'-azobis[2-(2-imidazolin-2-yl)propane]dihydro chloride, and 2,2'-azobis [2-(2-imidazolin-2-yl)propane]; and persulfates, such as potassium persulfate and ammonium persulfate.

In the case of the reversible addition-fragmentation chain transfer polymerization (RAFT), a chain transfer agent (RAFT agent) is used in addition to the polymerization initiator. This chain transfer agent is not particularly limited, but examples thereof include sulfur compounds having functional groups such as a dithioester group, a trithiocarbamate group, a xanthate group, and a dithiocarbamate group.

Specifically, examples of the chain transfer agent include compounds represented by the following chemical formulae (1) to (7), and these compounds can be used alone or in combination of two or more thereof. These compounds are preferably used because they are relative easy to obtain and can easily control the reaction.

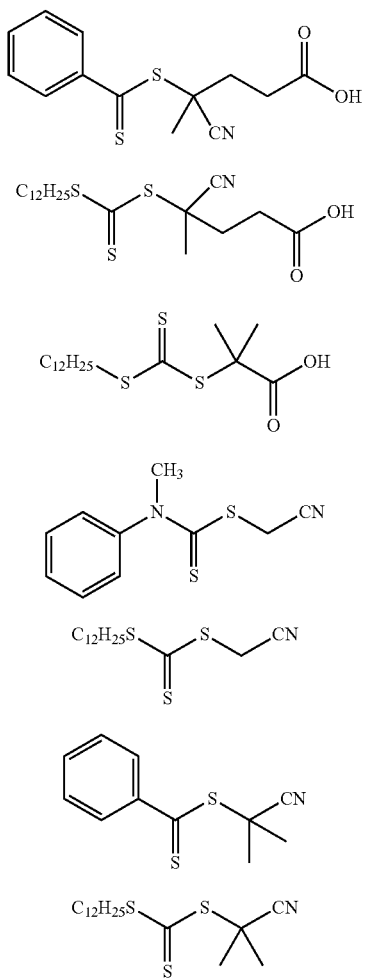

Among these compounds, as the chain transfer agent, 2-cyano-2-propyl benzodithioates represented by the above chemical formula (6) is preferable. Thus, it is possible to more easily perform the control of a reaction.

Further, when the reversible addition-fragmentation chain transfer polymerization (RAFT) is used, the ratio of the monomer M1, the polymerization initiator, and the chain transfer agent is suitably determined in consideration of the polymerization degree of the dispersing section 32 or the reactivity of a compound such as the monomer M1, but the molar ratio of monomer:polymerization initiator:chain transfer agent is preferably 500 to 5:5 to 0.25:1. Thus, the length (polymerization degree) of the dispersing section 32 obtained by polymerizing the monomer M1 can be appropriately set, and this dispersing section 32 can be produced at high efficiency by easily setting the molecular weight distribution thereof to 1.2 or less.

Examples of the solvent for preparing a solution used to polymerize the monomer M1 by living radical polymerization include: water; alcohols, such as methanol, ethanol, and butanol; hydrocarbons, such as hexane, octane, benzene, toluene, and xylene; ethers, such as diethyl ether and tetrahydrofuran; esters, such as ethyl acetate; and halogenated aromatic hydrocarbons, such as chlorobenzene and o-dichlorobenzene. These solvent can be used alone or as a mixed solvent.

It is preferable that the solution (reaction solution) is subjected to deoxidation treatment before the beginning of a polymerization reaction. As the deoxidation treatment, replacement treatment and purge treatment after vacuum deaeration using inert gas such as argon gas or nitrogen gas are exemplified.

Further, when the solution is heated to predetermined temperature at the time of the polymerization reaction of the monomer M1, the polymerization reaction of the monomer M1 can be more rapidly and reliably performed.

The heating temperature is slightly varied depending on the kind of the monomer M1, and is not particularly limited, but is preferably 30° C. to 100° C. When the heating temperature is within the above range, the heating time (reaction time) is preferably 5 hours to 48 hours.

When the reversible addition-fragmentation chain transfer polymerization(RAFT) is used, the fragment of the used chain transfer agent is present at one end (front end) of the dispersing section 32. The dispersing section 32 including this fragment acts as a chain transfer agent in the reaction of attaching the charging section 33 to the dispersing section 32 in the next process [1-2].

[1-2] Next, a charging section 33, which is positively or negatively charged the third monomer M3 to be connected to the dispersing section 32, is formed.

Thus, a diblock copolymer, in which the dispersing section 32 and the charging section 33 are connected with each other, is formed.

In this process [1-2], prior to the formation of the charging section 33 using the monomer M2, if necessary, impurities, such as unreacted monomer M1, solvent, and polymerization initiator, having used in the process [1-1], may be removed, and purification treatment (removal treatment) for isolating and purifying the dispersing section 32 may also be performed. Thus, the polymer 39 to be obtained in the next process [1-3] can become a uniform polymer having high purity. The purification treatment is not particularly limited, but examples thereof include column chromatography, recrystallization, and reprecipitation. These methods can be used alone or in combination of two or more thereof.

As described above, when the reversible addition-fragmentation chain transfer polymerization (RAFT) is used, the fragment of the used chain transfer agent is present at one end of the charging section 33. Therefore, the charging section 33 having such a configuration is formed by preparing a solution including the dispersing section 32 obtained in the process [1-1], the monomer M3 and the polymerization initiator and performing the living polymerization again in this solution.

Here, the solvent used in this process is the same as that used in the process [1-1]. Further, the polymerization conditions of the monomer M3 in the solution are the same as the polymerization conditions of the monomer M1 in the solution in the process [1-1].

When the reversible addition-fragmentation chain transfer polymerization(RAFT) is used, the fragment of the used chain transfer agent is present at one end (front end) of the charging section 33. The charging section 33 including this fragment acts as a chain transfer agent in the reaction of attaching the charging section 33 to the bonding section 31 in the next process [1-3].

[1-3] Next, a bonding section 31, in which the second monomer M2 including the second functional group having reactivity with the first functional group included in the mother particle 2 is polymerized, is formed in order to be connected to the charging section 33 included in the diblock copolymer in which the dispersing section 32 and the charging section 33 are connected with each other.

Thus, the polymer 39 that is formed of a triblock copolymer, in which the dispersing section 32, the charging section 33, and the bonding section 31 are connected with each other in this order, is formed.

In this process [1-3], prior to the formation of the bonding section 31 using the monomer M2, if necessary, impurities, such as unreacted monomer M3, solvent, and polymerization initiator, having used in the process [1-2], may be removed, and purification treatment (removal treatment) for isolating and purifying the diblock copolymer composed of the dispersing section 32 and the charging section 33 may also be performed. Thus, the polymer 39 to be obtained in this process [1-3] can become a uniform polymer having high purity. The purification treatment is not particularly limited, but examples thereof include column chromatography, recrystallization, and reprecipitation. These methods can be used alone or in combination of two or more thereof.

As described above, when the reversible addition-fragmentation chain transfer polymerization (RAFT) is used, the fragment of the used chain transfer agent is present at one end of the charging section 33. Therefore, the bonding section 31 having such a configuration is formed by preparing a solution including the diblock copolymer composed of the dispersing section 32 and the charging section 33 obtained after the process [1-2], the monomer M2 and the polymerization initiator and performing the living polymerization again in this solution.

Here, the solvent used in this process is the same as that used in the process [1-1]. Further, the polymerization conditions of the monomer M2 in the solution are the same as the polymerization conditions of the monomer M1 in the solution in the process [1-1].

[2] Next, a plurality of block copolymer 39 is connected to the mother particle 2 by reacting the first functional group included in the mother particle 2 with a plurality of second functional groups included in the bonding section 31 to form chemical bonds there between (second process).

Thus, an electrophoretic particle 1, in which at least a part of the mother particle 2 is covered with a coating layer 3, is obtained. As the process, the following dry process and wet process are exemplified.

Dry Process

In the dry process, first, the polymer 39 is appropriately mixed with the mother particle 2 in a solvent to prepare a solution. Here, in order to accelerate the hydrolysis of an alkoxysilyl group included in the polymer 39, if necessary, a very small amount of water, acid, or base may be added to the solution. Further, if necessary, heating, light irradiation, or the like may be performed.

In this case, the ratio of the volume of the solvent to the volume of the mother particle 2 is preferably 1 vol. % to 20 vol. % or less, and more preferably 5 vol. % to 10 vol. %. Thus, since it is possible to increase the contact chance of the polymer 39 to mother particle 2, it is possible to more reliably bond the bonding section 31 to the surface of the mother particle 2.

Next, the polymer 39 is adsorbed on the surface of the mother particle 2 at high efficiency by performing a dispersing using ultrasonic irradiation or by performing a stirring using ball mill or bead mill, and then the solvent is removed.

Next, the powder obtained by removing the solvent is heated to preferably 100° C. to 200° C. for 1 hour or more to decompose an alkoxysilyl group, thereby forming a chemical bond together with the hydroxyl group exposed to the surface of the mother particle 2, so as to obtain the electrophoretic particle 1.

Next, the excessive polymer 39 adsorbed on the surface of the mother particle 2 is removed without forming a chemical bond by performing cleaning several times again in the solvent while using a centrifugal separator.

Through the above processes, it is possible to obtain the purified electrophoretic particle 1.

Wet Process

In the wet process, first, the polymer 39 is appropriately mixed with the mother particle 2 in a solvent to prepare a solution. Here, in order to accelerate the hydrolysis of an alkoxysilyl group included in the polymer 39, if necessary, a very small amount of water, acid, or base may be added to the solution. Further, if necessary, heating, light irradiation, or the like may be performed.

In this case, the ratio of the volume of the solvent to the volume of the mother particle 2 is preferably 1 vol. % to 20 vol. % or less, and more preferably 5 vol. % to 10 vol. %. Thus, since it is possible to increase the contact chance of the polymer 39 to mother particle 2, it is possible to more reliably bond the bonding section 31 to the surface of the mother particle 2.

Next, the polymer 39 is adsorbed on the surface of the mother particle 2 at high efficiency by performing a dispersing using ultrasonic irradiation or by performing a stirring using ball mill or bead mill, and then the solution in this state is preferably heated to 100° C. to 200° C. for 1 hour to decompose the alkoxysilyl group, thereby forming a chemical bond together with the hydroxyl group exposed to the surface of the mother particle 2, so as to obtain the electrophoretic particle 1.

Next, the excessive polymer 39 adsorbed on the surface of the mother particle 2 is removed without forming a chemical bond by performing cleaning several times again in the solvent while using a centrifugal separator.

Through the above processes, it is possible to obtain the purified electrophoretic particle 1.

Here, when the electrophoretic particle 1 is dried, there is a case that the electrophoretic particle 1 is not dispersed in a dispersion solvent according to the kind of the monomer M1 constituting the polymer 39. In this case, it is preferable that, during the cleaning work, the reaction solvent is replaced by the dispersion solvent little by little (without drying process) using a solvent replacement method.

Here, the solvent used in this process is the same as the solvent exemplified in the above process [1-1].

Second Embodiment

Next, the second embodiment of the electrophoretic particle of the invention will be described.

Figure 3:
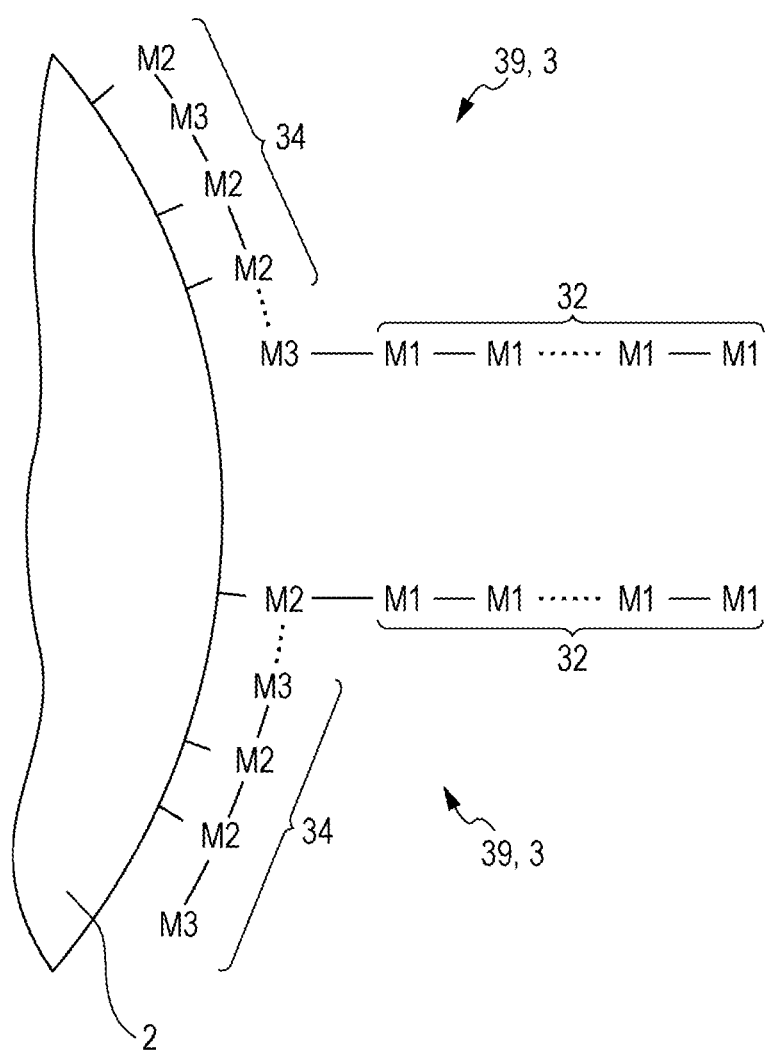
FIG. 3 is a schematic view of a block copolymer included in a second embodiment of an electrophoretic particle of the invention.

FIG. 3 is a schematic view of the block copolymer provided in the second embodiment of the electrophoretic particle of the invention.

Hereinafter, the electrophoretic particle of the second embodiment will be described based on the differences from the electrophoretic particle of the first embodiment, and the description thereof will be omitted for the same points.

The electrophoretic particle 1 of this embodiment, as shown in FIG. 3, is the same as the electrophoretic particle 1 of the first embodiment shown in FIG. 2, except that the configuration of the block copolymer 39 bonded to the mother particle 2 is different.

That is, in the electrophoretic particle of the second embodiment, the block copolymer 39 is configured such that a dispersing section 32, in which the first monomer M1 is polymerized, and a bonding•charging section 34, in which the second monomer M2 and the third monomer M3 are copolymerized, are connected with each other. In the block copolymer 39 having such as configuration, the dispersing section 32 is formed by the polymerization of the monomer M1 and includes a plurality of the dispersing units derived from the monomer M1, and the bonding•charging section 34 is formed by the copolymerization of the monomer M2 and the monomer M3 and includes a plurality of the bonding units derived from the monomer M2 and a plurality of the charging units derived from the monomer M3. In the bonding•charging section 34 included in the block copolymer 39, the first functional group included in the mother particle 2 reacts with the second functional group included in the bonding unit to allow the mother particle 2 and the block copolymer 39 to be chemically bonded to each other.

In the invention, the bonding•charging section 34 is a random copolymer which is formed by copolymerizing a plurality of second monomers M2 capable of forming a covalent bond by reacting with the first functional group provided on the surface of the mother particle 2 with a plurality of the positively or negatively charged third monomers M3, and is configured such that the plurality of the bonding units derived from the monomer M2 and the plurality of the charging units derived from the monomer M3 are randomly connected with each other.

The bonding•charging section 34 having such a configuration exhibits a function of being bonded to the surface of the mother particle 2 in the coating layer 3 included in the electrophoretic particle 1 because it has the bonding units, and exhibits a function of imparting positive or negative chargeability to the electrophoretic particle 1 in the electrophoretic dispersion because it has the charging units.

That is, the bonding•charging section 34 has both the function of the bonding section 31 and the function of the charging section 33, which have been described in the first embodiment. Therefore, the block copolymer 39 of the present embodiment including the dispersing section 32 and the bonding•charging section 34 exhibits the same function as the block copolymer 39 of the first embodiment including the dispersing section 32, the charging section 33, and the bonding section 31.

In one polymer 39, the number of the bonding units included in the bonding•charging section 34 is preferably 2 to 10, and more preferably 3 to 6. Further, the number of the charging units included in the bonding•charging section 34 is preferably 1 to 8, and more preferably 2 to 5.

Further, the electrophoretic particle 1 having the block copolymer 39 of the present embodiment including the dispersing section 32 and the bonding•charging section 34 can be obtained by performing a process (first process) of forming a plurality of the block copolymer 39 in each of which the dispersing section 32 and the bonding•charging section 34 are connected with each other instead of the first process in the method of manufacturing the electrophoretic particle having described in the first embodiment. Hereinafter, the first process in the present embodiment will be described.

Further, in the first process, through living radical polymerization using a polymerization initiator, 1B) the dispersing section 32 may be formed by the polymerization of the first monomer M1, and then the bonding•charging section 34 may be formed by the copolymerization of the second monomer M2 and the third monomer M3; and 2B) the bonding•charging section 34 and the dispersing section 32 may also be formed in this order. However, here, a case of forming a plurality of block copolymer 39 in the step 1B) will be described.

Hereinafter, each process will be described in detail.

[1B-1] First, the dispersing section 32 is formed by the polymerization of the first monomer M1.

The method of forming the dispersing section 32 is the same as that having described in the process [1-1] of the first embodiment.

When reversible addition-fragmentation chain transfer polymerization(RAFT) is used as the method of polymerizing the dispersing section 32, the fragment of the used chain transfer agent is present at one end (front end) of the dispersing section 32. The dispersing section 32 including this fragment acts as a chain transfer agent in the reaction of polymerizing the bonding•charging section 34 with the dispersing section 32 in the next process [1B-2].

[1B-2] Next, the bonding•charging section 34, in which the second monomer M2 including the second functional group having reactivity with the first functional group included in the mother particle 2, and the third monomer M3 positively or negatively charged are copolymerized, is formed.

Thus, the polymer 39, which is composed of the diblock copolymer in which the dispersing section 32 and the bonding•charging section 34 are connected, is formed.

In this process [1B-2], prior to the formation of the bonding•charging section 34 using the monomer M2 and the monomer M3, if necessary, impurities, such as unreacted monomer M1, solvent, and polymerization initiator, having used in the process [1B-1], may be removed, and purification treatment (removal treatment) for isolating and purifying the dispersing section 32 may also be performed. Thus, the polymer 39 to be obtained in this process [1B-2] can become a uniform polymer having high purity. The purification treatment is not particularly limited, but examples thereof include column chromatography, recrystallization, and reprecipitation. These methods can be used alone or in combination of two or more thereof.

As described above, when the reversible addition-fragmentation chain transfer polymerization(RAFT) is used, the fragment of the used chain transfer agent is present at one end of the dispersing section 32. Therefore, the bonding•charging section 34 having such a configuration is formed by preparing a solution including the dispersing section 32 obtained after the process [1B-1], the monomer M2 and the monomer M3, and the polymerization initiator and performing the living polymerization again in this solution.

Here, the solvent used in this process is the same as that used in the process [1-1] of the first embodiment. Further, the polymerization conditions of the monomer M2 and the monomer M3 in the solution are the same as the polymerization conditions of the monomer M1 in the solution in the process [1-1] of the first embodiment.

Through the above processes [1B-1] and [1B-2], the block copolymer 39 of this embodiment including the dispersing section 32 and the bonding•charging section 34 can be formed.

The same effect as the first embodiment can be obtained even by the electrophoretic particle of the second embodiment including the block copolymer 39 in which the dispersing section 32 and the bonding•charging section 34 are connected with each other.

Third Embodiment

Next, the third embodiment of the electrophoretic particle of the invention will be described.

Figure 4:
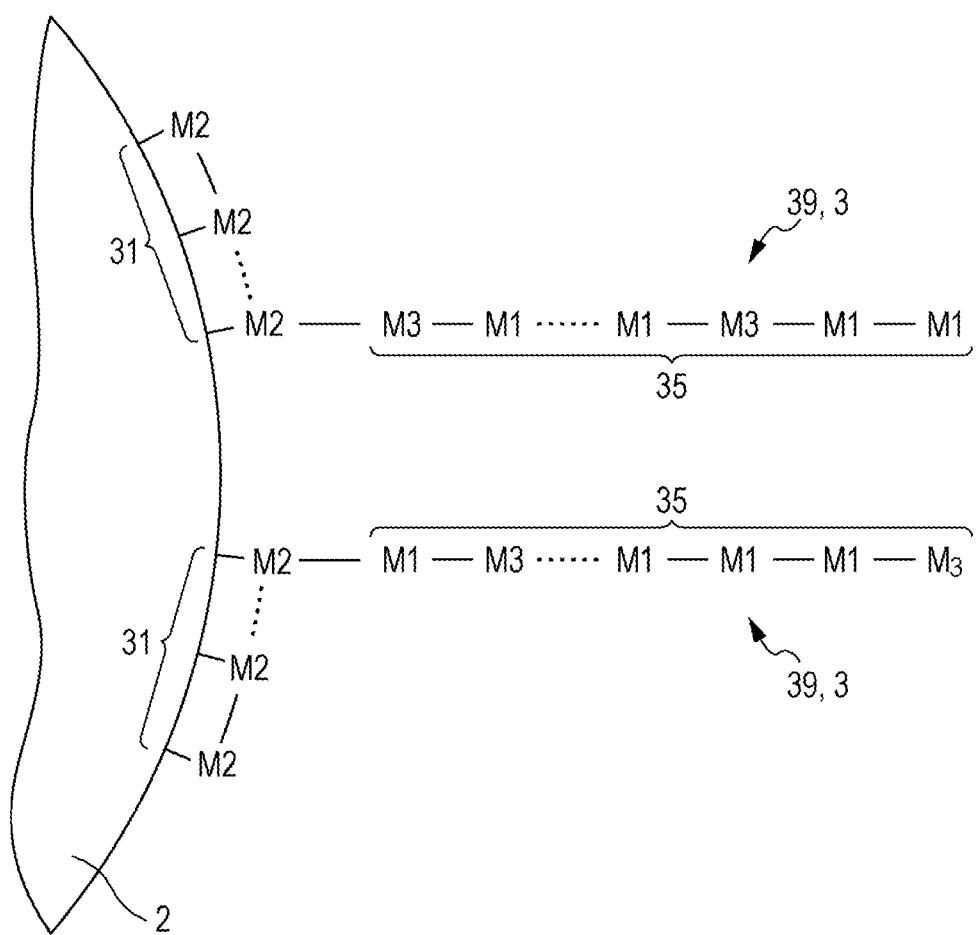
FIG. 4 is a schematic view of a block copolymer included in a third embodiment of an electrophoretic particle of the invention.

FIG. 4 is a schematic view of the block copolymer provided in the third embodiment of the electrophoretic particle of the invention.

Hereinafter, the electrophoretic particle of the third embodiment will be described based on the differences from the electrophoretic particle of the first embodiment, and the description thereof will be omitted for the same points.

The electrophoretic particle 1 of this embodiment, as shown in FIG. 4, is the same as the electrophoretic particle 1 of the first embodiment shown in FIG. 2, except that the configuration of the block copolymer 39 bonded to the mother particle 2 is different.

That is, in the electrophoretic particle of the third embodiment, the block copolymer 39 is configured such that a dispersing•charging section 35, in which the first monomer M1 and the third monomer M3 are copolymerized, and a bonding section 31, in which the second monomer M2 is polymerized, are connected with each other. In the block copolymer 39 having such as configuration, the dispersing•charging section 35 is formed by the copolymerization of the monomer M1 and the monomer M3 and includes a plurality of the dispersing units derived from the monomer M1 and a plurality of the charging units derived from the monomer M3, and the bonding section 31 is formed by the polymerization of the monomer M2 and includes a plurality of the bonding units derived from the monomer M2. In the bonding section 31 included in the block copolymer 39, the first functional group included in the mother particle 2 reacts with the second functional group included in the bonding unit to allow the mother particle 2 and the block copolymer 39 to be chemically bonded to each other.

In the invention, the dispersing•charging section 35 is a random copolymer which is formed by copolymerizing a plurality of monomers M1 having sites becoming side chains contributing to the dispersibility into a dispersion medium after polymerization with a plurality of the positively or negatively charged third monomers M3 in the electrophoretic dispersion, and is configured such that the plurality of the dispersing units derived from the monomer M1 and the plurality of the charging units derived from the monomer M3 are randomly connected with each other.

The dispersing•charging section 35 having such a configuration exhibits a function of imparting dispersibility to the electrophoretic particle 1 in the electrophoretic dispersion because it has the dispersing units, and exhibits a function of imparting positive or negative chargeability to the electrophoretic particle 1 in the electrophoretic dispersion because it has the charging units.

That is, the dispersing•charging section 35 has both the function of the dispersing section 32 and the function of the charging section 33, which have been described in the first embodiment.

Therefore, the block copolymer 39 of the present embodiment including the bonding section 31 and the dispersing•charging section 35 exhibits the same function as the block copolymer 39 of the first embodiment including the dispersing section 32, the charging section 33, and the bonding section 31.

In one polymer 39, the number of the dispersing units included in the dispersing•charging section 35 is preferably 1 to 20, and more preferably 3 to 10. Further, the number of the charging units included in the dispersing•charging section 35 is preferably 1 to 8, and more preferably 2 to 5.

Further, the electrophoretic particle 1 having the block copolymer 39 of the present embodiment including the dispersing•charging section 35 and the bonding section 31 can be obtained by performing a process (first process) of forming a plurality of the block copolymer 39 in each of which the dispersing•charging section 35 and the bonding section 31 are connected with each other instead of the first process in the method of manufacturing the electrophoretic particle having described in the first embodiment. Hereinafter, the first process in the present embodiment will be described.

Further, in the first process, through living radical polymerization using a polymerization initiator, 1C) the dispersing•charging section 35 may be formed by the copolymerization of the first monomer M1 and the third monomer M3, and then the bonding section 31 may be formed by the polymerization of the second monomer M2; and 2C) the bonding section 31 and the dispersing•charging section 35 may also be formed in this order. However, here, a case of forming a plurality of block copolymer 39 in the step 1C) will be described.

Hereinafter, each process will be described in detail.

[1C-1] First, the dispersing•charging section 35 is is a random copolymer which is formed by the copolymerization of the first monomer M1 and the third monomer M3.

The dispersing•charging section 35 can be formed in the same manner as the method having described in the process [1-1] of the first embodiment, except that a mixture of the first monomer M1 and the third monomer M3 is used instead of the first monomer M1.

When reversible addition-fragmentation chain transfer polymerization (RAFT) is used as the method of forming the dispersing•charging section 35, the fragment of the used chain transfer agent is present at one end (front end) of the dispersing•charging section 35. The dispersing•charging section 35 including this fragment acts as a chain transfer agent in the reaction of attaching the bonding section 31 to the dispersing•charging section 35 in the next process [1C-2].

[1C-2] Next, the bonding section 31, in which the second monomers M2 including the second functional group having reactivity with the first functional group included in the mother particle 2 are polymerized, is formed to be connected to the dispersing•charging section 35.

Thus, the polymer 39, which is composed of the block copolymer in which the dispersing•charging section 35 and the bonding section 31 are connected, is formed.

In this process [1C-2], prior to the formation of the bonding•charging section 34 using the monomer M2 and the monomer M3, if necessary, impurities, such as unreacted monomer M1 and monomer M3, solvent, and polymerization initiator, having used in the process [1C-1], may be removed, and purification treatment (removal treatment) for isolating and purifying the dispersing•charging section 35 may also be performed. Thus, the polymer 39 to be obtained in this process [1C-2] can become a uniform polymer having high purity. The purification treatment is not particularly limited, but examples thereof include column chromatography, recrystallization, and reprecipitation. These methods can be used alone or in combination of two or more thereof.

As described above, when the reversible addition-fragmentation chain transfer polymerization(RAFT) is used, the fragment of the used chain transfer agent is present at one end of the dispersing•charging section 35. Therefore, the bonding section 31 having such a configuration is formed by preparing a solution including the dispersing•charging section 35 obtained in the process [1C-1], the monomer M2, and the polymerization initiator and performing the living polymerization again in this solution.

Here, the solvent used in this process is the same as that used in the process [1-1] of the first embodiment. Further, the polymerization conditions of the monomer M2 in the solution are the same as the polymerization conditions of the monomer M1 in the solution in the process [1-1] of the first embodiment.

Through the above processes [1C-1] and [1C-2], the block copolymer 39 of this embodiment including the dispersing•charging section 35 and the bonding section 31 can be formed.

The same effect as the first embodiment can be obtained even by the electrophoretic particle of the third embodiment including the block copolymer 39 in which the dispersing•charging section 35 and the bonding section 31 are connected with each other.

Fourth Embodiment

Next, the fourth embodiment of the electrophoretic particle of the invention will be described.

Figure 5:
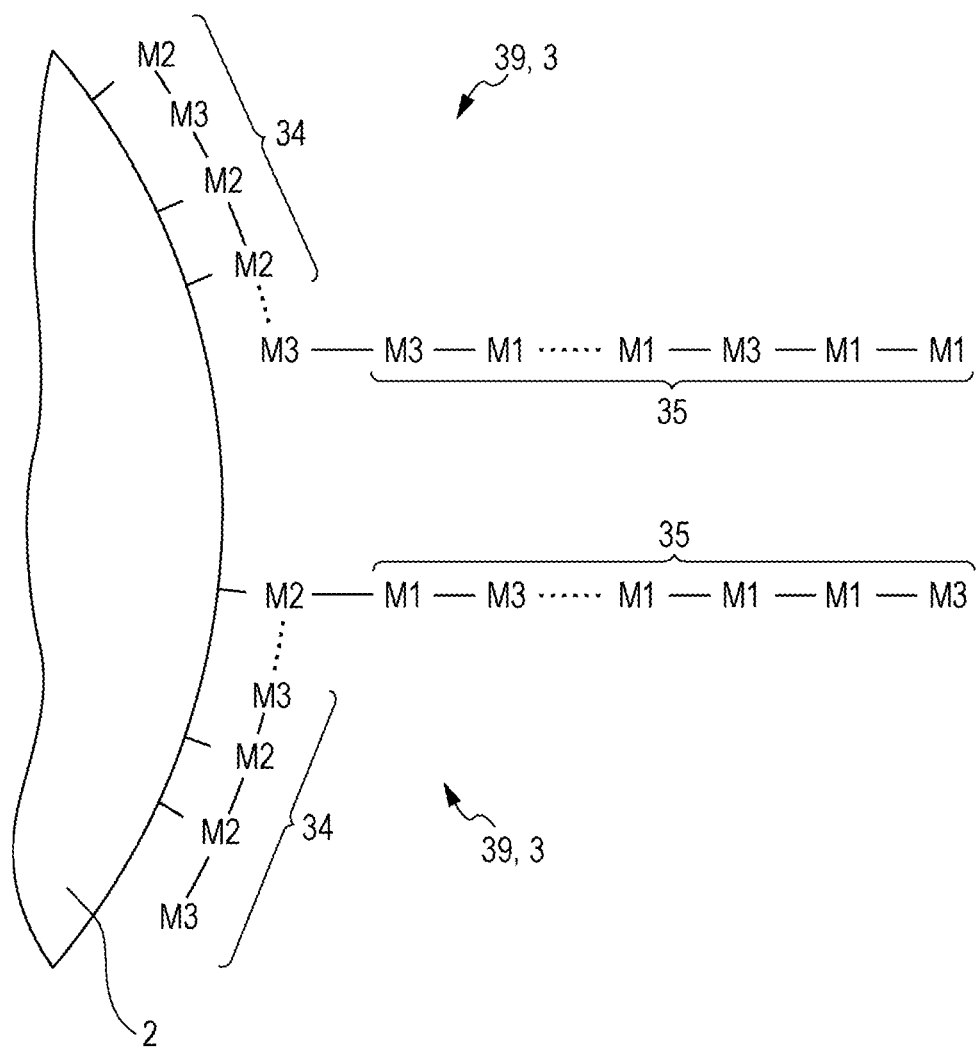
FIG. 5 is a schematic view of a block copolymer included in a fourth embodiment of an electrophoretic particle of the invention.

FIG. 5 is a schematic view of the block copolymer provided in the fourth embodiment of the electrophoretic particle of the invention.

Hereinafter, the electrophoretic particle of the fourth embodiment will be described based on the differences from the electrophoretic particle of the first embodiment, and the description thereof will be omitted for the same points.

The electrophoretic particle 1 of this embodiment, as shown in FIG. 5, is the same as the electrophoretic particle 1 of the first embodiment shown in FIG. 2, except that the configuration of the block copolymer 39 bonded to the mother particle 2 is different.

That is, in the electrophoretic particle of the fourth embodiment, the block copolymer 39 is configured such that a dispersing•charging section 35, in which the first monomer M1 and the third monomer M3 are copolymerized, and a bonding•charging section 34, in which the second monomer M2 and the third monomer M3 are copolymerized, are connected with each other. In the block copolymer 39 having such as configuration, the dispersing•charging section 35 is formed by the copolymerization of the monomer M1 and the monomer M3 and includes a plurality of the dispersing units derived from the monomer M1 and a plurality of the charging units derived from the monomer M3, and the bonding•charging section 34 is formed by the copolymerization of the monomer M2 and the monomer M3 and includes a plurality of the bonding units derived from the monomer M2 and a plurality of the charging units derived from the monomer M3. In the bonding•charging section 34 included in the block copolymer 39, the first functional group included in the mother particle 2 reacts with the second functional group included in the bonding unit to allow the mother particle 2 and the block copolymer 39 to be chemically bonded to each other.

In the invention, the bonding•charging section 34 is a random copolymer which is formed by copolymerizing a plurality of second monomers M2 each having the second functional group, which can form a covalent bond by reacting with the first functional group included on the surface of the mother particle 2, with a plurality of the positively or negatively charged third monomers M3, and is configured such that the plurality of the bonding units derived from the monomer M2 and the plurality of the charging units derived from the monomer M3 are randomly connected with each other.

The bonding•charging section 34 having such a configuration exhibits a function of being bonded to the surface of the mother particle 2 in the coating layer 3 included in the electrophoretic particle 1 because it has the bonding units, and exhibits a function of imparting positive or negative chargeability to the electrophoretic particle 1 in the electrophoretic dispersion because it has the charging units.

That is, the bonding•charging section 34 has both the function of the bonding section 31 and the function of the charging section 33, which have been described in the first embodiment.

Further, in the invention, the dispersing•charging section 35 is a random copolymer which is formed by copolymerizing a plurality of monomers M1 having sites becoming side chains contributing to the dispersibility into a dispersion medium after polymerization with a plurality of the positively or negatively charged third monomers M3 in the electrophoretic dispersion, and is configured such that the plurality of the dispersing units derived from the monomer M1 and the plurality of the charging units derived from the monomer M3 are randomly connected with each other.

The dispersing•charging section 35 having such a configuration exhibits a function of imparting dispersibility to the electrophoretic particle 1 in the electrophoretic dispersion because it has the dispersing units, and exhibits a function of imparting positive or negative chargeability to the electrophoretic particle 1 in the electrophoretic dispersion because it has the charging units.

That is, the dispersing•charging section 35 has both the function of the dispersing section 32 and the function of the charging section 33, which have been described in the first embodiment.

Therefore, the block copolymer 39 of the present embodiment including the bonding•charging section 34 and the dispersing•charging section 35 exhibits the same function as the block copolymer 39 of the first embodiment including the dispersing section 32, the charging section 33, and the bonding section 31.

In one polymer 39, the number of the bonding units included in the bonding•charging section 34 is preferably 2 to 10, and more preferably 3 to 6. Further, the number of the charging units included in the bonding•charging section 34 is preferably 1 to 8, and more preferably 2 to 5. The number of the dispersing units included in the dispersing•charging section 35 is preferably 1 to 20, and more preferably 3 to 10. Further, the number of the charging units included in the dispersing•charging section 35 is preferably 1 to 6, and more preferably 1 to 4.

Further, the electrophoretic particle having the block copolymer 39 of the present embodiment including the dispersing•charging section 35 and the bonding•charging section 34 can be obtained by performing a process (first process) of forming a plurality of the block copolymer 39 in each of which the dispersing•charging section 35 and the bonding•charging section 34 are connected with each other instead of the first process in the method of manufacturing the electrophoretic particle having described in the first embodiment. Hereinafter, the first process in the present embodiment will be described.

Further, in the first process, through living radical polymerization using a polymerization initiator, 1D) the dispersing•charging section 35 may be formed by the copolymerization of the first monomer M1 and the third monomer M3, and then the bonding•charging section 34 may be formed by the copolymerization of the second monomer M2 and the third monomer M3; and 2D) the bonding•charging section 34 and the dispersing•charging section 35 may also be formed in this order. However, here, a case of forming a plurality of block copolymer 39 in the step 1D) will be described.

Hereinafter, each process will be described in detail.

[1D-1] First, the dispersing•charging section 35 is is a random copolymer which is formed by the copolymerization of the first monomer M1 and the third monomer M3.

The dispersing•charging section 35 can be formed in the same manner as the method having described in the process [1-1] of the first embodiment, except that a mixture of the first monomer M1 and the third monomer M3 is used instead of the first monomer M1.

When reversible addition-fragmentation chain transfer polymerization (RAFT) is used as the method of forming the dispersing•charging section 35, the fragment of the used chain transfer agent is present at one end (front end) of the dispersing•charging section 35. The dispersing•charging section 35 including this fragment acts as a chain transfer agent in the reaction of bonding the bonding•charging section 34 to the dispersing•charging section 35 in the next process [1D-2].

[1D-2] Next, the bonding•charging section 34, in which the second monomers M2 including the second functional group having reactivity with the first functional group included in the mother particle 2 and the third monomer M3 positively or negatively charged are copolymerized, is formed to be connected to the dispersing•charging section 35.

Thus, the polymer 39, which is composed of the block copolymer in which the dispersing•charging section 35 and the bonding•charging section 34 are connected, is formed.

In this process [1D-2], prior to the formation of the bonding•charging section 34 using the monomer M2 and the monomer M3, if necessary, impurities, such as unreacted monomer M1 and monomer M3, solvent, and polymerization initiator, having used in the process [1D-1], may be removed, and purification treatment (removal treatment) for isolating and purifying the dispersing•charging section 35 may also be performed. Thus, the polymer 39 to be obtained in this process [1D-2] can become a uniform polymer having high purity. The purification treatment is not particularly limited, but examples thereof include column chromatography, recrystallization, and reprecipitation. These methods can be used alone or in combination of two or more thereof.

As described above, when the reversible addition-fragmentation chain transfer polymerization (RAFT) is used, the fragment of the used chain transfer agent is present at one end of the dispersing•charging section 35. Therefore, the bonding•charging section 34 having such a configuration is formed by preparing a solution including the dispersing•charging section 35 obtained in the process [1D-1], the monomer M2 and monomer M3, and the polymerization initiator and performing the living polymerization again in this solution.

Here, the solvent used in this process is the same as that used in the process [1-1] of the first embodiment. Further, the polymerization conditions of the monomer M2 and monomer M3 in the solution are the same as the polymerization conditions of the monomer M1 in the solution in the process [1-1] of the first embodiment.

Through the above processes [1D-1] and [1D-2], the block copolymer 39 of this embodiment including the dispersing•charging section 35 and the bonding•charging section 34 can be formed.

The same effects as the first embodiment can be obtained even by the electrophoretic particle of the fourth embodiment including the block copolymer 39 in which the dispersing•charging section 35 and the bonding•charging section 34 are connected with each other.

Electrophoretic Dispersion

Next, the electrophoretic dispersion of the invention will be described.

The electrophoretic dispersion is obtained by dispersing (suspending) at least one kind of the electrophoretic particles (electrophoretic particles of the invention) in a dispersion medium (liquid-phase dispersion medium).

As the dispersion medium, a dispersion medium having a boiling point of 100° C. or more and having relatively high insulation properties is preferably used. Examples of the dispersion medium include: various kinds of water (distilled water, pure water, and the like); glycols, such as butanol and glycerin; cellosolves, such as butyl cellosolve; esters, such as butyl acetate; ketones, such as dibutyl ketone; aliphatic hydrocarbons (fluidic paraffins), such as pentane; alicyclic hydrocarbons, such as cyclohexane; aromatic hydrocarbons, such as xylene; halogenated hydrocarbons, such as methylene chloride; aromatic heterocyclic compounds, such as pyridine; nitriles, such as acetonitrile; amides, such as N,N-dimethylformamide; carboxylates; and silicon oil or other various kinds of oils. These dispersion media can be used alone or in a mixture thereof.

Among these, as the dispersion medium, dispersion media containing aliphatic hydrocarbons (fluidic paraffins) or silicon oil as a main component is preferable. Since the dispersion medium containing fluidic paraffin or silicon oil as a main component has high aggregation inhibition effects of the electrophoretic particles 1, it is possible to suppress the sequential deterioration of display performance of the electrophoretic display device 920 shown in FIG. 6. Further, since fluidic paraffin or silicon oil has no unsaturated bond, there are advantages of excellent weather resistance and high safety.

Further, the specific permittivity of the dispersion medium is preferably 1.5 to 3, and more preferably 1.7 to 2.8. Such dispersion medium is excellent in dispersibility of the electrophoretic particles 1, and is also good in electrical insulation properties. Therefore, this dispersion medium contributes to the realization of an electrophoretic display device 920 capable of displaying a high-contrast image with low power consumption. The value of the specific permittivity thereof is measured at a frequency of 50 Hz, and is a value measured using a dispersion medium having a water content of 50 ppm or less at a temperature of 25° C.

Further, if necessary, various kinds of additives, such as a charge control agent, a lubricant, a stabilizer, and various dyes, each containing particles of an electrolyte, a surfactant (anionic or cationic), a metal soap, a resin material, a rubber material, oils, varnishes, and compounds, may be added to the dispersion medium.

The dispersing of the electrophoretic particles into the dispersion medium can be performed by one or a combination of two or more of a paint shaker method, a ball mill method, a media mill method, an ultrasonic dispersion method, and a stirring dispersion method.

In this electrophoretic dispersion, the electrophoretic particle 1 exhibits excellent dispersibility by the action of the polymer 39 included in the coating layer 3.

Electrophoretic Display Device

Next, an electrophoretic display device (electrophoretic device of the invention), to which an electrophoretic sheet of the invention is applied, will be described.

Figure 6:
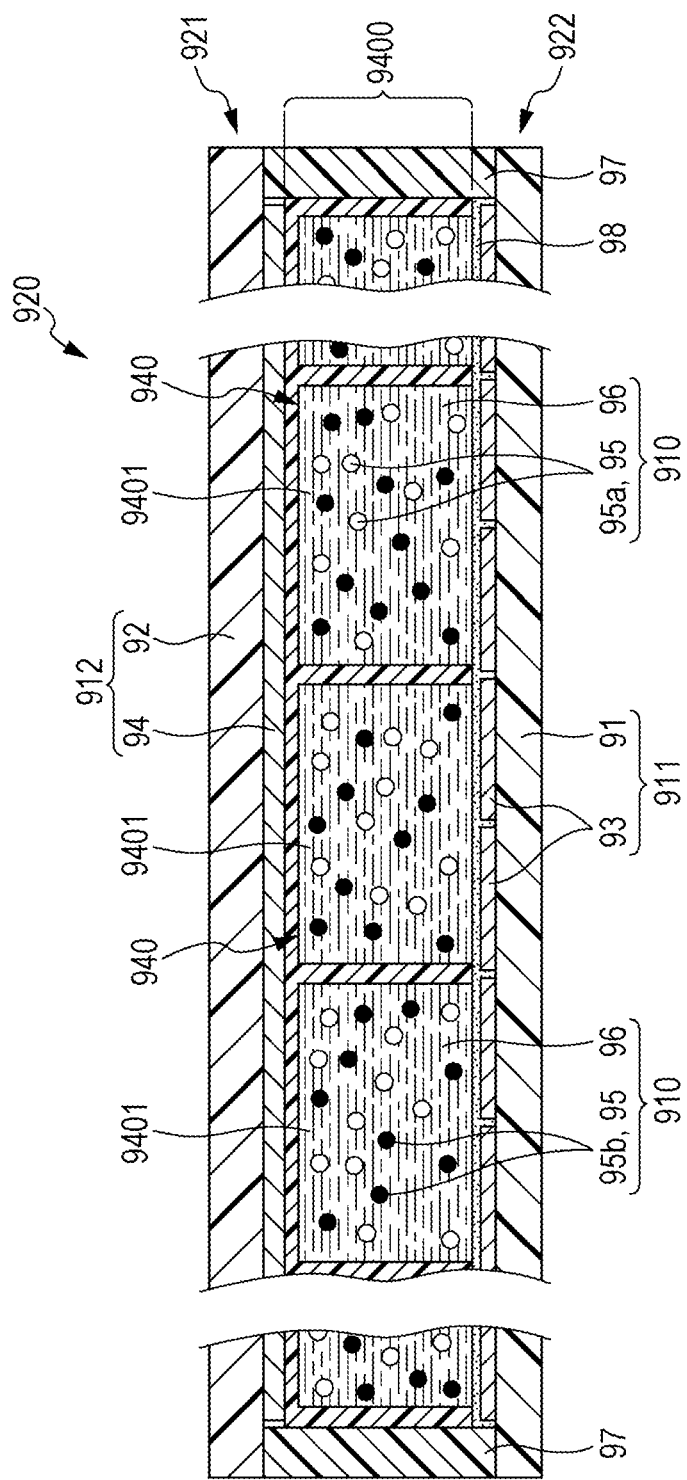
FIG. 6 is a schematic sectional view showing an embodiment of an electrophoretic display device.
Figure 7A:
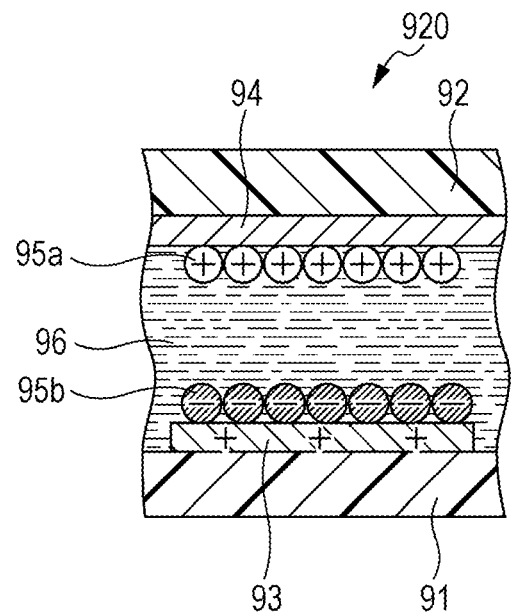
FIGS. 7A and 7B are schematic views showing the working principle of the electrophoretic display device shown in FIG. 6.
Figure 7B:
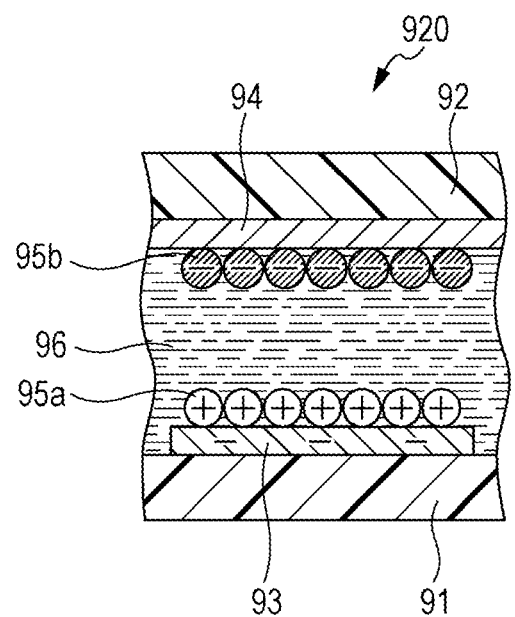

FIG. 6 is a schematic sectional view showing an embodiment of an electrophoretic display device, and FIGS. 7A and 7B are schematic views showing the working principle of the electrophoretic display device shown in FIG. 6. Hereinafter, for convenience of description, the upper side in FIGS. 6, 7A, and 7B is expressed as "upper", and the lower side therein is expressed as "lower".

The electrophoretic display device 920 shown in FIG. 6 includes an electrophoretic display sheet (front plane) 921, a circuit board (back plane) 922, an adhesive layer 98 for bonding the electrophoretic display sheet 921 and the circuit board 922, and a sealing portion 97 for hermetically sealing the gap between the electrophoretic display sheet 921 and the circuit board 922.

The electrophoretic display sheet (electrophoretic sheet of the invention) 921 includes: a substrate 912 including a flat plate-shaped base 92 and a second electrode 94 provided on the lower surface of the base 92; and a display layer 9400 including a matrix-shaped partition wall 940 provided on the lower surface (one side surface) of the substrate 912 and an electrophoretic dispersion 910.

Meanwhile, the circuit board 922 includes: a counter substrate 911 including a flat plate-shaped base 91 and a plurality of first electrodes 93 provided on the upper surface of the base 91; and a circuit (not shown) including a switching element such as TFT, which is provided on the counter substrate 911 (base 91).

Hereinafter, the configuration of each constituent will be sequentially described.

Each of the base 91 and the base 92 is formed of a sheet-shaped (flat plate-shaped) member, and has a function of supporting and protecting each member disposed therebetween.

The bases 91 and 92, respectively, may have flexibility, and may also have hardness. However, it is preferable that the bases 91 and 92 have flexibility. When the bases 91 and 92 having flexibility are used, the electrophoretic display device 920 having flexibility, that is, for example, the electrophoretic display device 920 useful for loading electronic paper can be obtained.

Further, when the bases (base layers) 91 and 92 respectively have flexibility, preferably, they are made of a resin material.

The average thickness of the bases 91 and 92 is appropriately set according to the constituent material and use thereof, and is not particularly limited, but is preferably 20 μm to 500 μm, and more preferably 25 μm to 250 μm.

The first electrode 93 and the second electrode 94, each of which has a layer shape or a film shape, are respectively provided on the surfaces of the bases 91 and 92 facing the partition walls 940, that is, the upper surface of the base 91 and the lower surface of the base 92.

When a voltage is applied between the first electrode 93 and the second electrode 94, an electric field is generated therebetween, and this electric field is applied to the electrophoretic particles(electrophoretic particles of the invention) 95.

In the present embodiment, the second electrode 94 is a common electrode, the first electrode 93 is an individual electrode divided (pixel electrode connected to a switching element) in a matrix form, and the portion at which the second electrode 94 and the first electrode 93 overlap each other constitutes a pixel.

The constituent material for each of the electrodes 93 and 94 is not particularly limited as long as it has substantial conductivity.

The average thickness of the electrodes 93 and 94 is appropriately set according to the constituent material and use thereof, and is not particularly limited, but is preferably 0.05 μm to 10 μm, and more preferably 0.05 μm to 5 μm.

Among each of the bases 91 and 92 and each of the electrodes 93 and 94, the base and the electrode disposed on the display surface side (in this embodiment, the base 92 and the second electrode 94) have light transmissivity, that is, are substantially transparent (colorless transparent, colored transparent, or translucent).

The electrophoretic display sheet 921 is in contact with the lower surface of the second electrode 94 to provide the display layer 9400.

The display layer 9400 is configured such that the electrophoretic dispersion (the above-described electrophoretic dispersion of the invention) 910 is contained (enclosed) in a plurality of pixel spaces 9401 defined by the partition wall 940.

The partition wall 940 is configured to be divided in a matrix form between the counter substrate 911 and the substrate 912.

Examples of the constituent material of the partition wall 940 include various resin materials including: thermoplastic resin such as acrylic resin, urethane resin, and olefin resin; and thermosetting resins such as epoxy resin, melamine resin, and phenolic resin. These resins can be used alone or in combination of two or more thereof.

In the present embodiment, the electrophoretic dispersion 910 contained in the pixel spaces 9401 is obtained by dispersing(suspending) two kinds of colored particles 95*b* and white particles 95*a* (at least one kind of electrophoretic particles 1) in a dispersion medium 96. As electrophoretic dispersion 910, the above-described electrophoretic dispersion of the invention is applied.

In this electrophoretic display device 920, when a voltage is applied between the first electrode 93 and the second electrode 94, an electric field is generated therebetween, and colored particles 95*b* and white particles 95*a* (electrophoretic particles 1) are electrophoresed toward either of the electrodes by the electric field.

In the present embodiment, the white particles 95*a* are positively charged, and the colored particle (black particles) 95*b* are negatively charged. That is, an electrophoretic particle 1 in which a mother particle 2 is positively charged is used as the white particle 95*a*, and an electrophoretic particle 1 in which a mother particle 2 is negatively charged is used as the colored particle 95*b*.

When this electrophoretic particles 1 are used, if the first electrode 93 is set to a positive potential, as shown in FIG. 7A, the white particles 95*a* move to the second electrode 94 to gather to the second electrode 94. In contrast, the colored particles 95*b* move to the first electrode 93 to gather to the first electrode 93. Therefore, when the electrophoretic display device 920 is seen from above (display surface), the color of the white particles 95*a* is visible, that is, white color is visible.

On the contrary, if the first electrode 93 is set to a negative potential, as shown in FIG. 7B, the white particles 95*a* move to the first electrode 93 to gather to the first electrode 93. In contrast, the colored particles 95*b* move to the second electrode 94 to gather to the second electrode 94. Therefore, when the electrophoretic display device 920 is seen from above (display surface), the color of the colored particles 95*b* is visible, that is, black color is visible.

In such a configuration, when the charge amount of the white particles 95*a* and the colored particles 95*b* (electrophoretic particles 1), the polarity of the electrode 93 or 94, and the potential difference between the electrodes 93 and 94 are appropriately set, desired information (image) is displayed on the display surface of the electrophoretic display device 920 depending on the combination of colors of the white particles 95*a* and the colored particles 95*b* and the number of the particles gathered to the electrodes 93 and 94.

It is preferable that the specific gravity of the electrophoretic particles 1 is set to be substantially equal to the specific gravity of the dispersion medium 96. Thus, the electrophoretic particles 1 can stay at the predetermined position in the dispersion medium 96 for a long time even after the application of a voltage between the electrodes 93 and 94 is stopped. That is, the information displayed by the electrophoretic display device 920 retained for a long time.

The average particle diameter of the electrophoretic particles 1 is preferably 0.1 µm to 10 µm, and more preferably 0.1 µm to 7.5 µm. When the average particle diameter of the electrophoretic particles 1 is within the above range, it is possible to reliably prevent the aggregation of the electrophoretic particles 1 or the precipitation of the electrophoretic particles 1 in the dispersion medium 96. As a result, it is possible to suitably prevent the deterioration in display quality of the electrophoretic display device 920.

In the present embodiment, the electrophoretic display sheet 921 and the circuit board 922 are bonded through the adhesive layer 98. Thus, it is possible to more reliably fix the electrophoretic display sheet 921 and the circuit board 922.

The average thickness of the adhesive layer 98 is particularly limited, but is preferably 1 µm to 30 µm, and more preferably 5 µm to 20 µm.

Between the base 91 and the base 92, the sealing portion 97 is provided along the edges thereof. Each of the electrodes 93 and 94, the display layer 9400, and the adhesive layer 98 are hermetically sealed by the sealing portion 97. Thus, it is possible to prevent water from permeating into the electrophoretic display device 920, and thus it is possible to more reliably prevent the deterioration in the display performance of the electrophoretic display device 920.

The constituent material of the sealing portion 97 is the same as the above-described constituent material of the partition wall 940.

Electronic Apparatus

Next, an electronic apparatus according to the invention will be described.

The electronic apparatus according to the invention includes the above-described electrophoretic display device 920.

Electronic Paper

First, an embodiment in which the electronic apparatus of the invention is applied to an electronic paper will be described.

Figure 8:
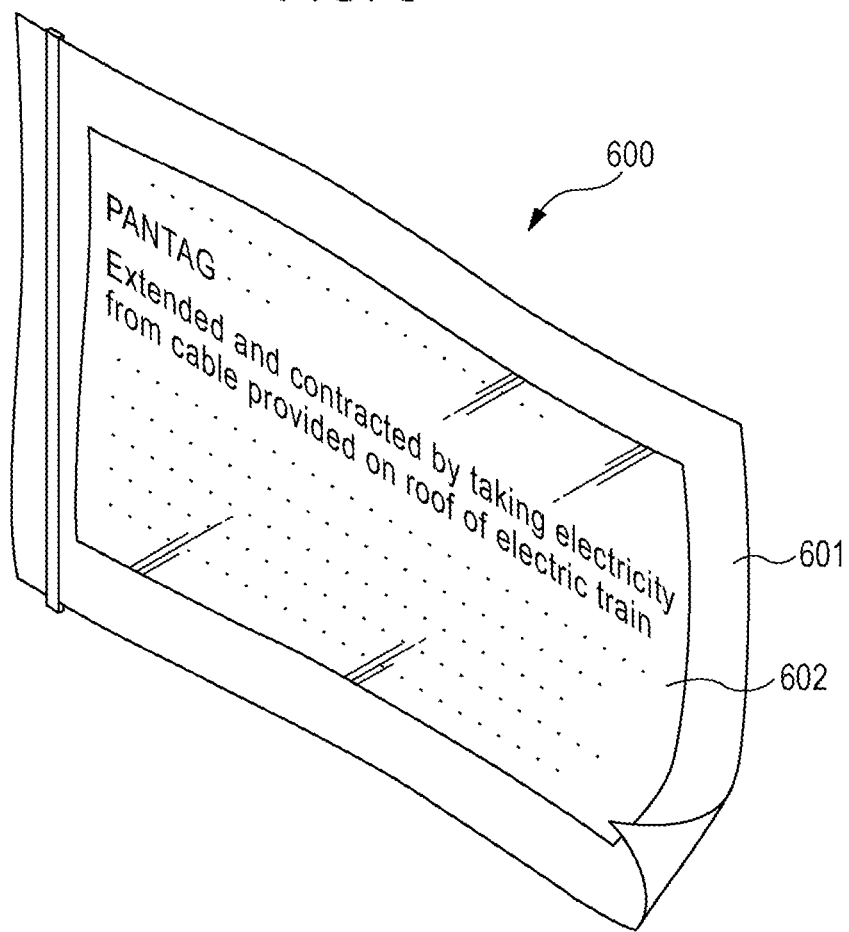
FIG. 8 is a perspective view showing an embodiment in which an electronic apparatus is applied to an electronic paper.

FIG. 8 is a perspective view showing an embodiment in which the electronic apparatus of the invention is applied to an electronic paper.

The electronic paper 600 shown in FIG. 8 includes: a main body 601 composed of a rewritable sheet having the same quality and flexibility as a paper; and a display unit 602.

In the electronic paper 600, the display unit 602 is composed of the above-described electrophoretic display device 920.

Display

First, an embodiment in which the electronic apparatus of the invention is applied to a display will be described.

Figure 9A:
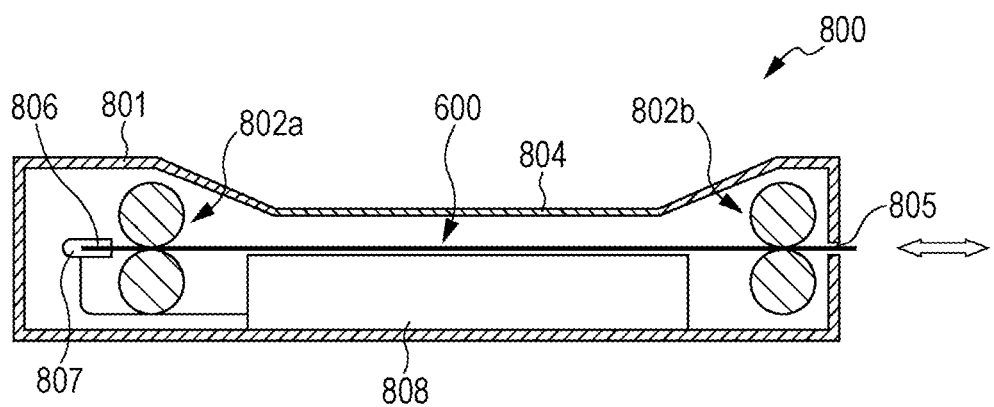
FIGS. 9A and 9B are views showing an embodiment in which an electronic apparatus is applied to a display.
Figure 9B:
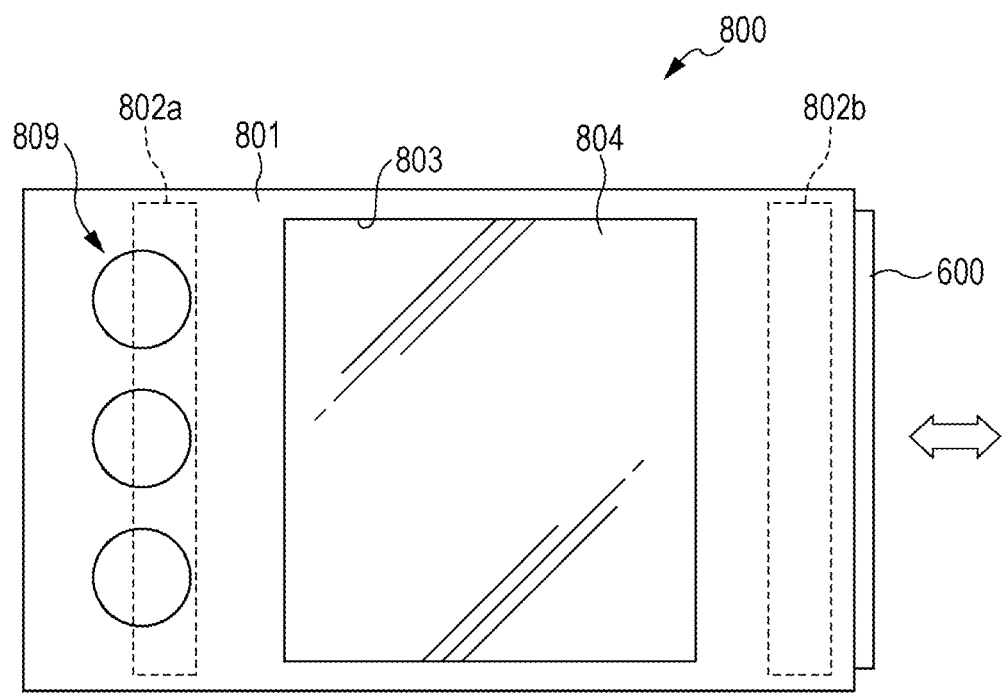
Figure 10:
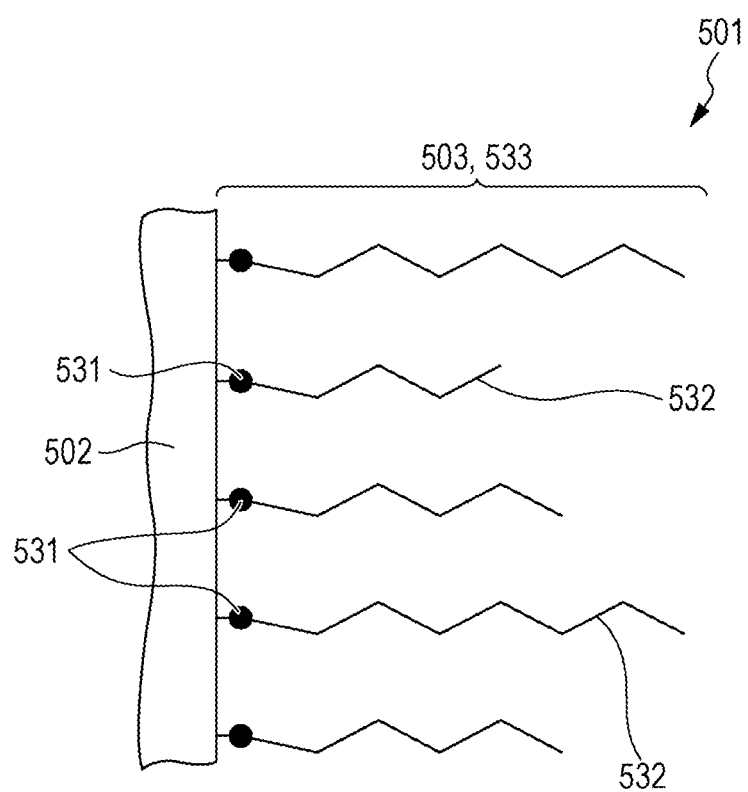
FIG. 10 is a longitudinal sectional view showing the structure of an electrophoretic particle known in the related art.

FIGS. 9A and 9B are views showing an embodiment in which the electronic apparatus of the invention is applied to a display. Here, FIG. 9A is a sectional view, and FIG. 9B is a plan view.

The display (display device) 800 shown in FIGS. 9A and 9B includes: a main body 801; and an electronic paper 600 detachably provided in the main body 801.

An insertion opening 805 capable of inserting the electronic paper 600 is formed in the lateral side (right side of FIG. 9A) of the main body 801. Further, two pairs of conveying rollers 802a and 802b are provided in the main body 801. When the electronic paper 600 is inserted into the main body 801 through an insertion opening 805, the electronic paper 600 is provided in the main body 801 with being sandwiched by the pairs of conveying rollers 802a and 802b.

Further, a rectangular hole 803 is formed in the display surface side (paper front side of FIG. 9B) of the main body 801, and a transparent glass plate 804 is fitted into this hole 803. Thus, it is possible to visually recognize the electronic paper 600 provided in the main body 801 from the outside of the main body 801. That is, this display 800 is configured such that the electronic paper 600 provided in the main body 801 is visually recognized through the transparent glass plate 804.

Further, a terminal 806 is provided in the insertion direction end (left side of FIG. 9A) of the electronic paper 600, and a socket 807 connected with the terminal 806 is provided in the main body 801 in a state in which the electronic paper 600 is provided in the main body 801. A controller 808 and an operation unit 809 are electrically connected to the socket 807.

In the display 800, the electronic paper 600 is detachably provided in the main body 801, and can be portably used in a state of being detached from the main body 801.

Further, in the display 800, the electronic paper 600 is composed of the above-described electrophoretic display device 920.

The electronic apparatus of the invention is not limited to the above-described applications, and application examples thereof include televisions, view winder type or monitor direct view type video tape recorders, car navigation systems, pagers, electronic notebooks, calculators, electronic newspapers, word processors, personal computers, workstations, videophones, POS terminals, and touch panels. The electrophoretic display device 920 of the invention can be applied to the display units of these various electronic apparatuses.

Heretofore, the method of manufacturing an electrophoretic particle, the electrophoretic particle, the electrophoretic dispersion, the electrophoretic sheet, the electrophoretic device, and the electronic apparatus according to the invention have been described based on the illustrated embodiments. However, the invention is not limited thereto, and the configuration of each component can be replaced with any configuration having a similar function. Also, in the invention, other arbitrary components may be added.

Furthermore, in the method of manufacturing an electrophoretic particle according to the invention, one or more desired processes may be added.

EXAMPLES

Hereinafter, the invention will be described in more detail with reference to the following examples.

Manufacturing of electrophoretic particle, preparation of electrophoretic dispersion, and evaluation of electrophoretic dispersion.

Example 1

1. Synthesis of Dispersing Section 10 g (2 mmol) of a silicone macromonomer having a molecular weight of 5,000 ("SILAPLANE FM-0721", manufactured by JNC Co., Ltd.), 45 mg (0.2 mmol) of 2-cyano-2-propyl benzodithioate, 33 mg (0.2 mmol) of azobisisobutyronitrile, and ethyl acetate were put into a flask, and then heated and stirred for 20 hours to polymerize the silicone macromonomer. This silicone macromonomer was cooled to room temperature to complete a reaction, and then a solvent was removed, so as to obtain a red-brown silicone polymer reaction solution.

The obtained reaction solution was purified with a silica gel column using a mixed solvent of hexane and chloroform as a developing solvent to remove impurities, so as to isolate a silicone polymer. The weight average molecular weight (Mw) and number average molecular weight (Mn) of the silicone polymer obtained by gel permeation chromatography using toluene as a developing solvent were measured, and it was confirmed that the molecular weight distribution (Mw/Mn) thereof was 1.2 or less.

2. Synthesis of Charging Section 1 g (17 μmol) of the obtained silicone polymer, 71 mg (343 μmol) of [2-(methacryloyloxy)ethyl]trimethyl ammonium chloride (manufactured by Sigma-Aldrich Ltd.), 3.3 mg (20 μmol) of azobisisobutyronitrile, and ethyl acetate were put into a flask, and then heated and stirred to perform a polymerization. This silicone polymer was cooled to room temperature to complete a reaction, and then a solvent was removed, so as to obtain a block copolymer.

3. Synthesis of Bonding Section 1 g (17 μmol) of the obtained silicone polymer, 31 mg (107 μmol) of 3-methacryloxypropyl triethoxy silane ("KBE-503", manufactured by Shin-Etsu Silicone Co., Ltd.), 3.3 mg (20 μmol) of azobisisobutyronitrile, and ethyl acetate were put into a flask, and then heated and stirred to perform a polymerization. This silicone polymer was cooled to room temperature to complete a reaction, and then a solvent was removed, so as to obtain a triblock copolymer.

4. Adjustment of Electrophoretic Dispersion 1 g of the above-obtained block copolymer, 5 g of titanium black particle ("13M", manufactured by Mitsubishi Materials Electronic Chemicals Co., Ltd.), and silicone oil ("KF-96-20cs", manufactured by Shin-Etsu Chemical Co., Ltd.) were put into a flask, and then heated and stirred to bond the block copolymer to the particle, so as to an electrophoretic particle. The unreacted block copolymer was removed from the solution after the reaction, and silicone oil is replaced with "KF-96-2cs" manufactured by Shin-Etsu Chemical Co., Ltd., so as to obtain a black electrophoretic dispersion exhibiting good dispersibility. In this case, the content of the electrophoretic particle in the dispersion was adjusted to be 33 wt %.

Example 2

A dispersing section was synthesized in the same manner as in Example 1, except that the amount of 2-cyano-2-propyl benzodithioate used was 110 mg (0.5 mmol).

A charging section was synthesized in the same manner as in Example 1, except that 1 g (45 μmol) of the obtained silicone polymer was used, and the amount of [2-(methacryloyloxy)ethyl]trimethyl ammonium chloride was 188 mg (908 μmol).

A bonding section was synthesized in the same manner as in Example 1, except that 1 g (45 μmol) of the obtained block copolymer was used, and the amount of 3-methacryloxypropyl triethoxy silane was 40 mg (136 μmol).

The electrophoretic dispersion of Example 2 was adjusted in the same manner as in Example 1, except that the obtained block copolymer was used.

Example 3

A dispersing section was synthesized in the same manner as in Example 1, except that the amount of 2-cyano-2-propyl benzodithioate used was 21 mg (0.1 mmol).

A charging section was synthesized in the same manner as in Example 1, except that 1 g (9 μmol) of the obtained silicone polymer was used, and the amount of [2-(methacryloyloxy)ethyl]trimethyl ammonium chloride was 37 mg (180 μmol).

A bonding section was synthesized in the same manner as in Example 1, except that 1 g (9 μmol) of the obtained block copolymer was used, and the amount of 3-methacryloxypropyl triethoxy silane was 16 mg (55 μmol).

The electrophoretic dispersion of Example 3 was adjusted in the same manner as in Example 1, except that the obtained block copolymer was used.

Example 4

A dispersing section was synthesized in the same manner as in Example 1, except that the amount of 2-cyano-2-propyl benzodithioate used was 220 mg (1 mmol).

A charging section was synthesized in the same manner as in Example 1, except that 1 g (83 μmol) of the obtained silicone polymer was used, and the amount of [2-(methacryloyloxy)ethyl]trimethyl ammonium chloride was 345 mg (1667 μmol).

A bonding section was synthesized in the same manner as in Example 1, except that 1 g (83 μmol) of the obtained block copolymer was used, and the amount of 3-methacryloxypropyl triethoxy silane was 73 mg (252 μmol).

The electrophoretic dispersion of Example 4 was adjusted in the same manner as in Example 1, except that the obtained block copolymer was used.

Example 5

A dispersing section was synthesized in the same manner as in Example 1.

A charging section was synthesized in the same manner as in Example 1, except the amount of [2-(methacryloyloxy)ethyl]trimethyl ammonium chloride used was 18 mg (87 μmol).

A bonding section was synthesized in the same manner as in Example 1, except that 1 g (17 μmol) of the obtained block copolymer was used.

The electrophoretic dispersion of Example 5 was adjusted in the same manner as in Example 1, except that the obtained block copolymer was used.

Example 6

A dispersing section was synthesized in the same manner as in Example 1.

A charging section was synthesized in the same manner as in Example 1, except the amount of [2-(methacryloyloxy)ethyl]trimethyl ammonium chloride used was 172 mg (831 μmol).

A bonding section was synthesized in the same manner as in Example 1, except that 1 g (17 μmol) of the obtained block copolymer was used.

The electrophoretic dispersion of Example 6 was adjusted in the same manner as in Example 1, except that the obtained block copolymer was used.

Example 7

A dispersing section was synthesized in the same manner as in Example 1.

A charging section was synthesized in the same manner as in Example 1, except the amount of [2-(methacryloyloxy) ethyl]trimethyl ammonium chloride used was 345 mg (1667 μmol).

A bonding section was synthesized in the same manner as in Example 1, except that 1 g (17 μmol) of the obtained block copolymer was used.

The electrophoretic dispersion of Example 7 was adjusted in the same manner as in Example 1, except that the obtained block copolymer was used.

Example 8

A dispersing section was synthesized in the same manner as in Example 1.

A charging section was synthesized in the same manner as in Example 1, except 37 mg (343 μmol) of sodium methacrylate was used instead of [2-(methacryloyloxy)ethyl] trimethyl ammonium chloride.

A bonding section was synthesized in the same manner as in Example 1, except that 1 g (17 μmol) of the obtained block copolymer was used.

The electrophoretic dispersion of Example 8 was adjusted in the same manner as in Example 1, except that the obtained block copolymer was used.

Example 9

A dispersing section was synthesized in the same manner as in Example 1, except that 10 g (39 mmol) of n-lauryl methacrylate having a molecular weight of 254 (manufactured by Sigma-Aldrich Co., Ltd.) was used instead of silicone macromonomer.

A charging section was synthesized in the same manner as in Example 1, except 1 g (18 μmol) of the obtained polymer was used, and the amount of [2-(methacryloyloxy)ethyl] trimethyl ammonium chloride used was 73 mg (353 μmol).

A bonding section was synthesized in the same manner as in Example 1, except that 1 g (18 μmol) of the obtained block copolymer was used.

The electrophoretic dispersion of Example 9 was adjusted in the same manner as in Example 1, except that the obtained block copolymer was used, and a hydrocarbon-based solvent ("Isopar G", manufactured by manufactured by Exon Mobil Corporation) was used instead of silicone oil.

Example 10

A dispersing section was synthesized in the same manner as in Example 1.

A polymerization was performed using the obtained silicone polymer: 1 g (17 μmol), [2-(methacryloyloxy) ethyl] trimethyl ammonium chloride: 71 mg (343 μmol), 3-methacryloxypropyl triethoxysilane: 31 mg (107 μmol), and azobisisobutyronitrile: 3.3 mg (20 μmol), so as to a polymer including a bonding•charging section in which a monomer having a charging group and a monomer having a bonding group are randomly polymerized.

The electrophoretic dispersion of Example 10 was adjusted in the same manner as in Example 1, except that the obtained block copolymer was used.

Example 11

A polymerization was performed using silicone macromonomer having a molecular weight of 5,000: 10 g (2 mmol), 2-cyano-2-propyl benzodithioate: 45 mg(0.2 mmol), [2-(methacryloyloxy)ethyl]trimethyl ammonium chloride: 830 mg (4 mmol), and azobisisobutyronitrile: 33 mg (0.2 mmol), so as to a polymer solution including a dispersing•charging section in which a monomer having a dispersing group and a monomer having a charging group are randomly polymerized.

The obtained reaction solution (polymer solution) was purified with a silica gel column using a mixed solvent of hexane and chloroform as a developing solvent to remove impurities, so as to isolate a silicone polymer. The weight average molecular weight (Mw) and number average molecular weight (Mn) of the polymer obtained by gel permeation chromatography using toluene as a developing solvent were measured, and it was confirmed that the molecular weight distribution (Mw/Mn) thereof was 1.2 or less.

A bonding section was synthesized in the same manner as in Example 1, except that 1 g (15 μmol) of the obtained polymer was used.

The electrophoretic dispersion of Example 11 was adjusted in the same manner as in Example 1, except that the obtained block copolymer was used.

Example 12

A polymer solution including a dispersing•charging section in which a monomer having a dispersing group and a monomer having a charging group are randomly polymerized was obtained in the same manner as in Example 11, except that the amount of [2-(methacryloyloxy)ethyl]trimethyl ammonium chloride used was 415 mg (2 mmol).

A polymerization was performed using the obtained polymer: 1 g (17 μmol), [2-(methacryloyloxy)ethyl]trimethyl ammonium chloride: 415 mg (2 mmol), 3-methacryloxypropyl triethoxysilane: 31 mg (107 μmol), and azobisisobutyronitrile: 3.3 mg (20 μmol), so as to a polymer including a bonding•charging section in which a monomer having a charging group and a monomer having a bonding group are randomly polymerized.

The electrophoretic dispersion of Example 12 was adjusted in the same manner as in Example 1, except that the obtained polymer was used.

Comparative Example 1

The electrophoretic dispersion of Comparative Example 1 was adjusted in the same manner as in Example 1, except that the synthesis of a charging section was omitted.

Comparative Example 2

The electrophoretic dispersion of Comparative Example 2 was adjusted in the same manner as in Example 1, except that a random copolymer, which was obtained by performing a polymerization using silicone macromonomer having a molecular weight of 5,000: 10 g (2 mmol), 2-cyano-2-propyl-benzodithioate: 45 mg (0.2 mmol), [2-(methacryloyloxy)ethyl]trimethyl ammonium chloride: 830 mg (4 mmol), 3 methacryloxypropyl triethoxysilane: 350 mg (1.2 mmol), and azobisisobutyronitrile: 33 mg (0.2 mmol), was used.

5. Evaluation of Electrophoretic Dispersion

Each of the electrophoretic dispersions of Examples and Comparative Examples was evaluated as follows.

That is, after the electrophoretic dispersion was injected into a transparent electrode cell having a thickness of 50 μm, the mobility of electrophoretic particles in the electrophoretic dispersion was measured.

Further, the white electrophoretic dispersion, which was adjusted in the same manner as above except that titanium oxide particles capable of being changed to titanium black particles, was mixed with a black electrophoretic dispersion such that the volume ratio of white electrophoretic dispersion:black electrophoretic dispersion is 10:1. Then, the mixture was injected into the transparent electrode cell having a thickness of 50 μm, the white reflectance and black reflectance thereof were measured, and a contrast was calculated therefrom.

The evaluation results thereof are given in Table below.

TABLE

| | Dispersing section | | | | Charging section | | Bonding section | | Charging polarity | Evaluation | |
|---|---|---|---|---|---|---|---|---|---|---|---|
| | Monomer | Molecular weight | Weight average molecular weight | Number average molecular weight | Molecular weight distribution | Monomer | Number of units | Monomer | Number of units | Electrophoretic mobility [um2/V · s] | Contrast |
| Example 1 | SILAPLANE | 5,000 | 60,000 | 58,000 | 1.03 | 2-(methacryloyloxy)ethyl]trimethylammonium chloride | 20.0 | KEB-503 | 6.0 | positive | 450 | 16 |
| Example 2 | FM-0721 | | 23,000 | 20,000 | 1.15 | | 20.0 | | 6.0 | positive | 350 | 12 |
| Example 3 | | | 112,000 | 105,000 | 1.07 | | 20.0 | | 6.0 | positive | 550 | 15 |
| Example 4 | | | 12,000 | 11,000 | 1.09 | | 20.0 | | 6.0 | positive | 100 | 10 |
| Example 5 | | | 60,000 | 58,000 | 1.03 | | 5.0 | | 6.0 | positive | 200 | 11 |
| Example 6 | | | 60,000 | 58,000 | 1.03 | | 50.0 | | 6.0 | positive | 600 | 17 |
| Example 7 | | | 60,000 | 58,000 | 1.03 | | 100.0 | | 6.0 | positive | 600 | 15 |
| Example 8 | | | 60,000 | 58,000 | 1.03 | Sodium methacrylate | 20.0 | | 6.0 | negative | 300 | 16 |
| Example 9 | n-lauryl methacrylate | 254 | 57,000 | 54,000 | 1.06 | 2-(methacryloyloxy)ethyl]trimethylammonium chloride | 20.0 | | 6.0 | positive | 350 | 19 |
| Example 10 | SILAPLANE | 5,000 | 60,000 | 58,000 | 1.03 | | 20.0 | | 6.0 | positive | 400 | 13 |
| Example 11 | FM-0721 | | 65,000 | 61,000 | 1.07 | | 20.0 | | 6.0 | positive | 500 | 11 |
| Example 12 | | | 64,000 | 61,000 | 1.05 | | 20.0 | | 6.0 | positive | 650 | 8 |
| Comparative Example 1 | | | 60,000 | 58,000 | 1.03 | | 0.0 | | 6.0 | uncharged | x | x |
| Comparative Example 2 | | | 67,000 | 59,000 | 1.14 | | 20.0 | | 6.0 | positive | 80 | 7 |

As apparent from Table 1, in the electrophoretic dispersion of each Example, it was found that the electrophoretic particles in this electrophoretic dispersion exhibit excellent chargeability, mobility, and contrast.

In contrast, in the electrophoretic dispersion of Comparative Example 1, it was found that the electrophoretic particles are not charged, and, in the electrophoretic dispersion of Comparative Example 2, it was found that the electrophoretic particles exhibits chargeability, whereas both mobility and contrast cannot be excellent.

The entire disclosure of Japanese Patent Application No. 2014-227459, filed Nov. 7, 2014 is expressly incorporated by reference herein.

What is claimed is:

1. A method of manufacturing an electrophoretic particle, in which the electrophoretic particle includes a particle having a first functional group on the surface thereof and a block copolymer bonded to the particle, comprising:

polymerizing a first monomer having a site contributing to dispersibility into a dispersion medium, a second monomer including a second functional group having reactivity with the first functional group, and a positively or negatively-charged third monomer by living polymerization without random copolymerizing the first monomer and the second monomer so as to obtain the block copolymer; and reacting the first functional group and the second functional group to connect the block copolymer to the particle, wherein the first monomer is a silicone macromonomer represented by the following general formula (I):

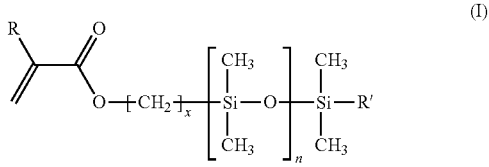

wherein in the formula (I), R represents a hydrogen atom or a methyl group, R' represents a hydrogen atom or an alkyl group having 1 to 4 carbon atoms, n represents an integer of 0 or more, and x represents an integer of 1 to 3.

2. The method of manufacturing an electrophoretic particle according to claim 1, wherein the block copolymer is formed such that a dispersing section in which the first monomer is polymerized, a bonding section in which the second monomer is polymerized, and a charging section in which the third monomer is polymerized are connected in this order.

3. The method of manufacturing an electrophoretic particle according to claim 2,
wherein, in the forming of the block copolymer, the dispersing section in which the first monomer is polymerized is formed, the bonding section in which the second monomer is polymerized is formed, and then the charging section in which the third monomer is polymerized is formed.

4. The method of manufacturing an electrophoretic particle according to claim 1,
wherein the block copolymer is formed such that a dispersing section in which the first monomer is polymerized and a bonding•charging section in which the second monomer and the third monomer are copolymerized are connected with each other.

5. The method of manufacturing an electrophoretic particle according to claim 4,
wherein, in the forming of the block copolymer, the dispersing section in which the first monomer is polymerized is formed, and then the bonding•charging section in which the second monomer and the third monomer are copolymerized is formed.

6. The method of manufacturing an electrophoretic particle according to claim 1,
wherein the block copolymer is formed such that a dispersing•charging section in which the first monomer and the third monomer are copolymerized and a bonding section in which the second monomer is polymerized are connected with each other.

7. The method of manufacturing an electrophoretic particle according to claim 6,
wherein, in the forming of the block copolymer, the dispersing•charging section in which the first monomer and the third monomer are copolymerized is formed, and then the bonding section, in which the second monomer is polymerized is formed.

8. The method of manufacturing an electrophoretic particle according to claim 1,
wherein the block copolymer is formed such that a dispersing•charging section in which the first monomer and the third monomer are copolymerized and a bonding•charging section in which the second monomer and the third monomer are copolymerized are connected with each other.

9. The method of manufacturing an electrophoretic particle according to claim 8,
wherein, in the forming of the block copolymer, the dispersing•charging section in which the first monomer and the third monomer are copolymerized is formed, and then the bonding•charging section in which the second monomer and the third monomer are copolymerized is formed.

10. The method of manufacturing an electrophoretic particle according to claim 1,
wherein the living polymerization is living radical polymerization.

11. The method of manufacturing an electrophoretic particle according to claim 10,
wherein the living radical polymerization is reversible addition-fragmentation chain transfer polymerization.

12. An electrophoretic particle, comprising:
a particle having a first functional group on the surface thereof; and
a block copolymer bonded to the particle,
wherein the block copolymer is formed by polymerizing a first monomer having a site contributing to dispersibility into a dispersion medium, a second monomer including a second functional group having reactivity with the first functional group, and a positively or negatively-charged third monomer without random copolymerizing the first monomer and the second monomer,
wherein, in the unit derived from the second monomer, the first functional group reacts with the second functional group to connect the plurality of block copolymers to the particle, and
wherein the first monomer is a silicone macromonomer represented by the following general formula (I):

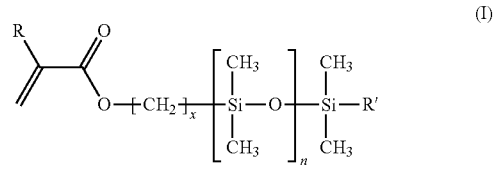

wherein in the formula (I), R represents a hydrogen atom or a methyl group, R' represents a hydrogen atom or an alkyl group having 1 to 4 carbon atoms, n represents an integer of 0 or more, and x represents an integer of 1 to 3.

13. The electrophoretic particle according to claim 12,
wherein the block copolymer is configured such that a dispersing section in which the first monomer is polymerized, a bonding section in which the second monomer is polymerized, and a charging section in which the third monomer is polymerized are connected in this order.

14. The electrophoretic particle according to claim 12,
wherein the block copolymer is configured such that a dispersing section in which the first monomer is polymerized and a bonding•charging section in which the second monomer and the third monomer are copolymerized are connected with each other.

15. The electrophoretic particle according to claim 13,
wherein the block copolymer is configured such that the molecular weight distribution in the dispersing section is 1.2 or less.

16. The electrophoretic particle according to claim 15,
wherein the weight average molecular weight of the dispersing section is 10,000 to 100,000.

17. The electrophoretic particle according to claim 12,
wherein the molecular weight of the silicone chains located at a base end of the dispersing section, the base end being an end of the dispersing section that is connected to the bonding section, is smaller than the molecular weight of the silicone chains located at a front end of the dispersion section that is opposite to the base end.

18. The electrophoretic particle according to claim 12,
wherein the block copolymer is configured such that a dispersing•charging section in which the first monomer and the third monomer are copolymerized and a bonding section in which the second monomer is polymerized are connected with each other.

19. The electrophoretic particle according to claim 18, wherein the bonding section is formed by polymerizing 2 to 12 repeat units derived from the second monomer.

20. The electrophoretic particle according to claim 12, wherein the block copolymer is configured such that a dispersing•charging section in which the first monomer and the third monomer are copolymerized and a bonding•charging section in which the second monomer and the third monomer are copolymerized are connected with each other.

21. The electrophoretic particle according to claim 12, wherein the silicone macromonomer has a molecular weight of 1,000 to 10,000.

22. An electrophoretic dispersion, comprising the electrophoretic particle manufactured by the method of manufacturing an electrophoretic particle according to claim 1 or the electrophoretic particle according to claim 12.

23. An electrophoretic sheet, comprising:
a substrate; and
a plurality of structures which are disposed on the substrate and each of which contains the electrophoretic dispersion according to claim 22.

24. An electrophoretic device, comprising:
the electrophoretic sheet according to claim 23.

25. An electronic apparatus, comprising:
the electrophoretic device according to claim 24.

* * * * *